United States Patent
Srikanth et al.

(10) Patent No.: US 10,191,689 B2
(45) Date of Patent: Jan. 29, 2019

(54) SYSTEMS AND METHODS FOR PAGE MANAGEMENT USING LOCAL PAGE INFORMATION

(71) Applicant: Intel Corporation, Santa Clara, CA (US)

(72) Inventors: Sriseshan Srikanth, Santa Clara, CA (US); Lavanya Subramanian, Santa Clara, CA (US); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 15/393,998

(22) Filed: Dec. 29, 2016

(65) Prior Publication Data

US 2018/0188994 A1 Jul. 5, 2018

(51) Int. Cl.
*G06F 3/06* (2006.01)

(52) U.S. Cl.
CPC .......... *G06F 3/0652* (2013.01); *G06F 3/0608* (2013.01); *G06F 3/0656* (2013.01); *G06F 3/0659* (2013.01); *G06F 3/0673* (2013.01)

(58) Field of Classification Search
CPC .... G06F 3/0608; G06F 3/0652; G06F 3/0659; G06F 3/0656; G06F 3/0673

USPC ................................................. 711/154, 133
See application file for complete search history.

(56) References Cited

U.S. PATENT DOCUMENTS

| | | | | |
|---|---|---|---|---|
| 6,799,241 | B2 * | 9/2004 | Kahn ................ | G06F 12/0215 711/105 |
| 6,910,114 | B2 * | 6/2005 | Kareenahalli ....... | G06F 12/0215 711/167 |
| 7,076,617 | B2 | 7/2006 | Dodd | |
| 2007/0233943 | A1 * | 10/2007 | Teh .................... | G06F 12/0215 711/105 |
| 2012/0059983 | A1 * | 3/2012 | Nellans .............. | G06F 12/0215 711/105 |

* cited by examiner

*Primary Examiner* — Pierre Miche Bataille
(74) *Attorney, Agent, or Firm* — Alliance IP, LLC

(57) ABSTRACT

Systems for page management using local page information are disclosed. The system may include a processor, including a memory controller, and a memory, including a row buffer. The memory controller may include circuitry to determine that a page stored in the row buffer has been idle for a time exceeding a predetermined threshold determine whether the page is exempt from idle page closures, and, based on a determination that the page is exempt, refrain from closing the page. Associated methods are also disclosed.

20 Claims, 15 Drawing Sheets

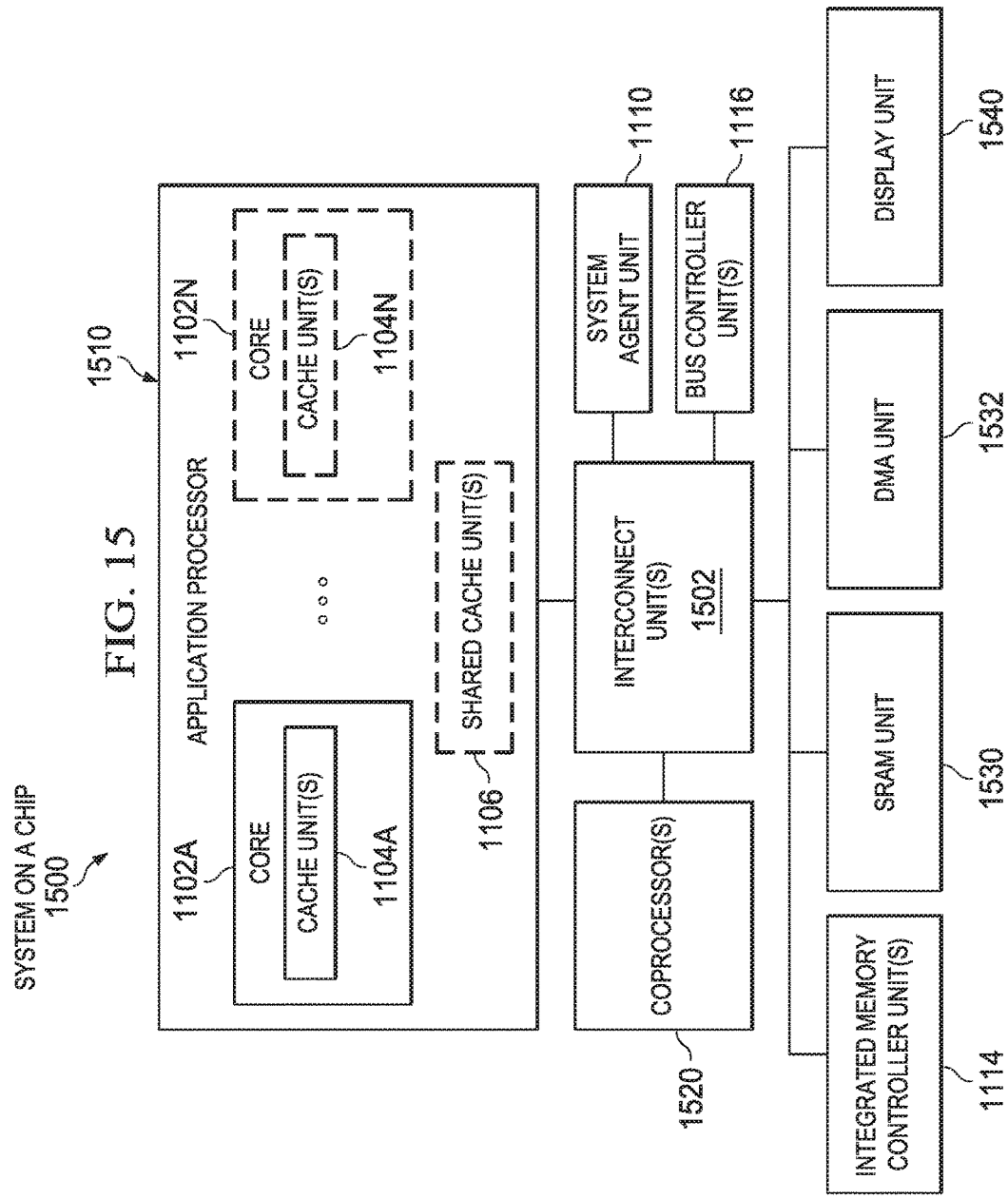

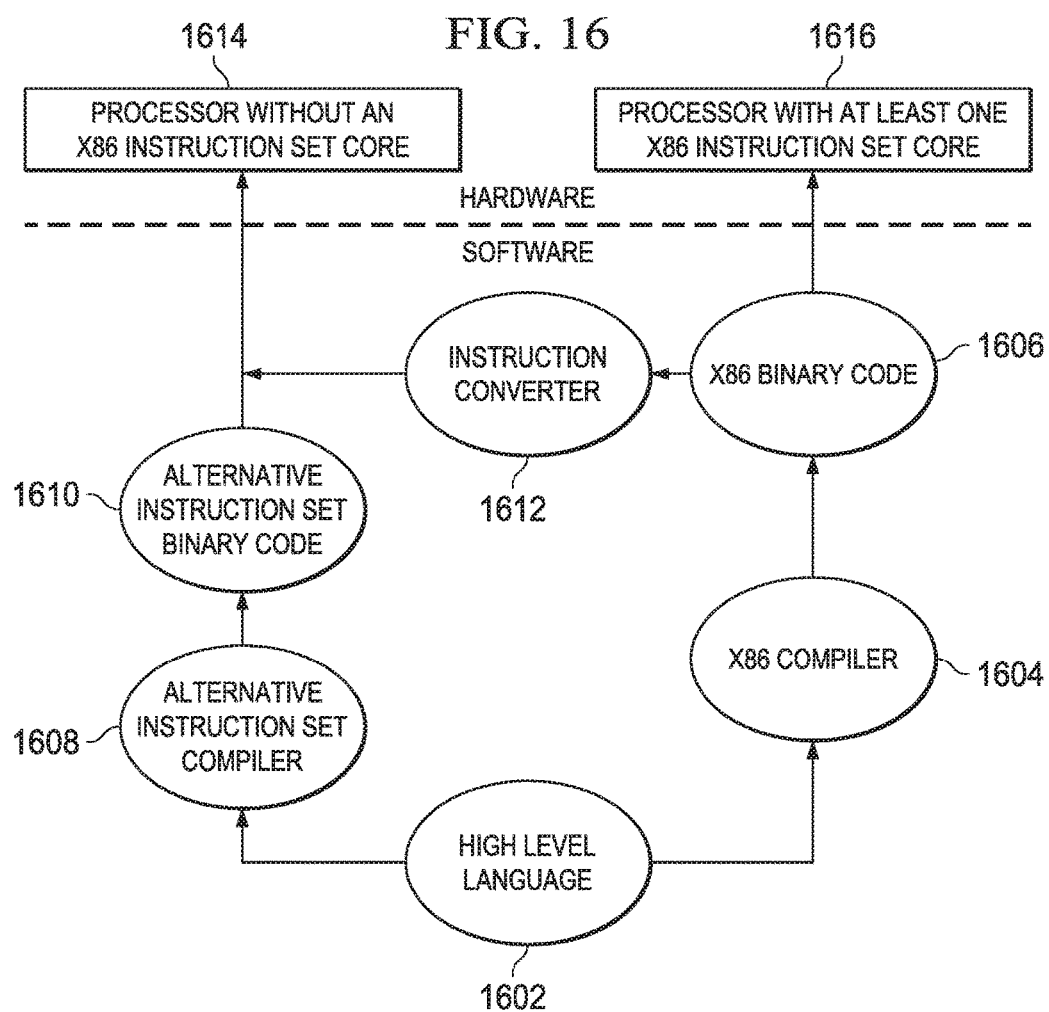

SYSTEMS AND METHODS FOR PAGE MANAGEMENT USING LOCAL PAGE INFORMATION

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Each processor may include a cache or multiple caches. Processors may be implemented in a system on chip.

DESCRIPTION OF THE FIGURES

Various embodiments of the present disclosure are illustrated by way of example and not limitation in the Figures of the accompanying drawings, in which like references indicate similar elements, and in which:

FIGS. 12 through 15 are block diagrams illustrating example computer architectures, according to some embodiments of the present disclosure; and FIG. 16 is a block diagram illustrating the use of a compiler and a software instruction converter to convert binary instructions in a source instruction set to binary instructions in a target instruction set, according to some embodiments of the present disclosure.

DETAILED DESCRIPTION

Figure 1A:
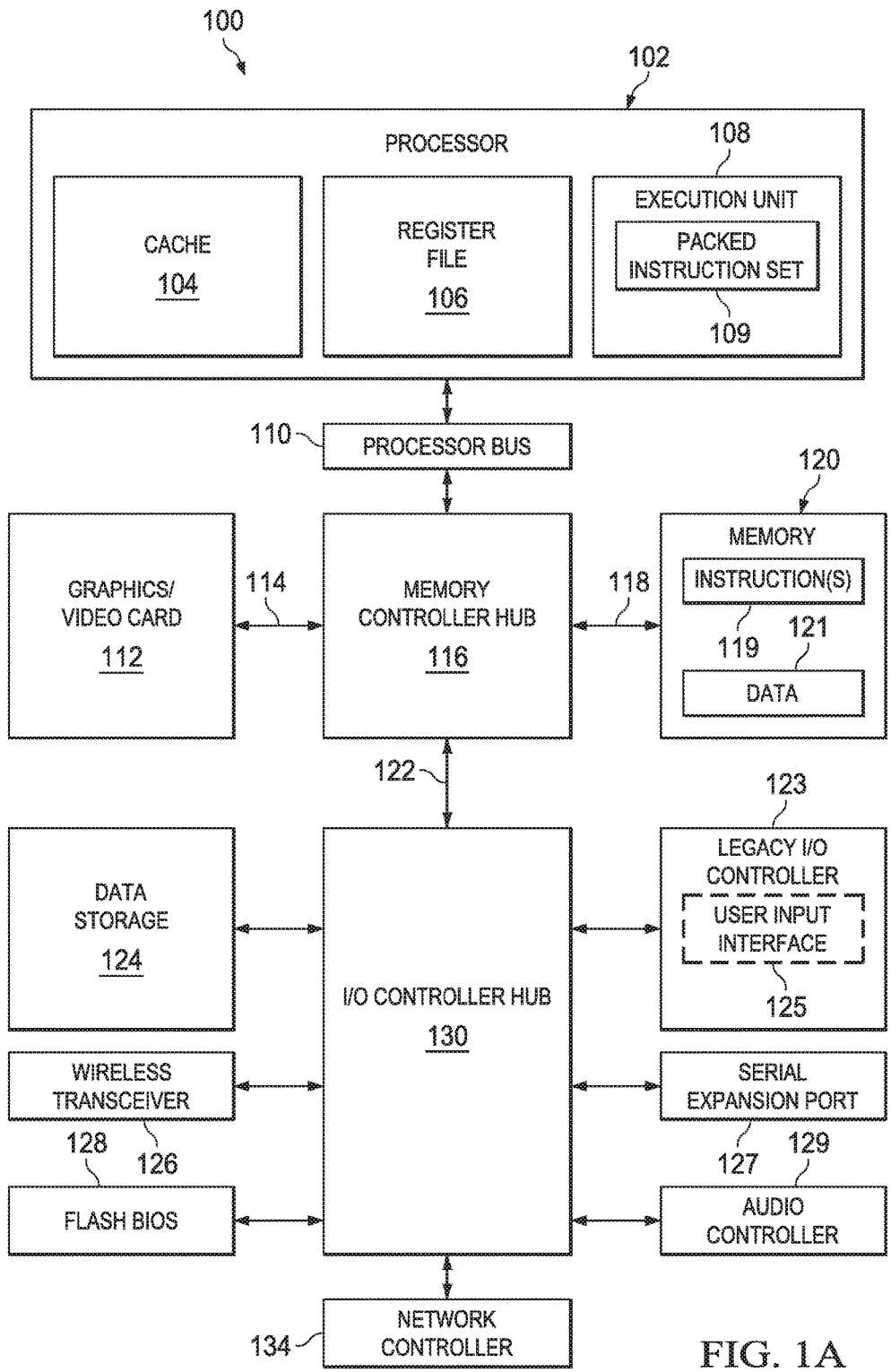
FIG. 1A is a block diagram of an exemplary computer system formed with a processor that may include execution units to execute an instruction, in accordance with embodiments of the present disclosure.

The following description describes an instruction and processing logic for implementing page management using local page information. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that other embodiments may be practiced without such specific details. Additionally, some well-known structures, circuits, and the like have not been shown in detail to avoid unnecessarily obscuring the example embodiments of the present disclosure included herein.

References in the specification to "one embodiment," "an embodiment," "an example embodiment," etc., indicate that the embodiment described may include a particular feature, structure, or characteristic. However, not all embodiments of the present disclosure necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such a feature, structure, or characteristic in connection with other embodiments of the disclosure, whether or not such a connection is explicitly described.

Although some example embodiments are described with reference to a processor, other embodiments may be applicable to other types of integrated circuits and logic devices. Similar techniques and teachings of various embodiments of the present disclosure may be applied to other types of circuits or semiconductor devices that may benefit from higher pipeline throughput and improved performance. The teachings of the example embodiments of the present disclosure may be applicable to any processor or machine that performs data manipulations. However, other embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the examples below describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In some embodiments, functions associated with embodiments of the present disclosure may be embodied in machine-executable instructions. The instructions may be used to cause a general-purpose or special-purpose processor that may be programmed with the instructions to perform the operations of the present disclosure. Some embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of some embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform some embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with some embodiments of the present disclosure. System 100 may include a component, such as a processor 102, to employ execution units including logic to perform algorithms for processing data, in accordance with the present disclosure, such as in the example embodiments described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments of the present disclosure are not limited to computer systems. Some embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Some embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

In another example system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
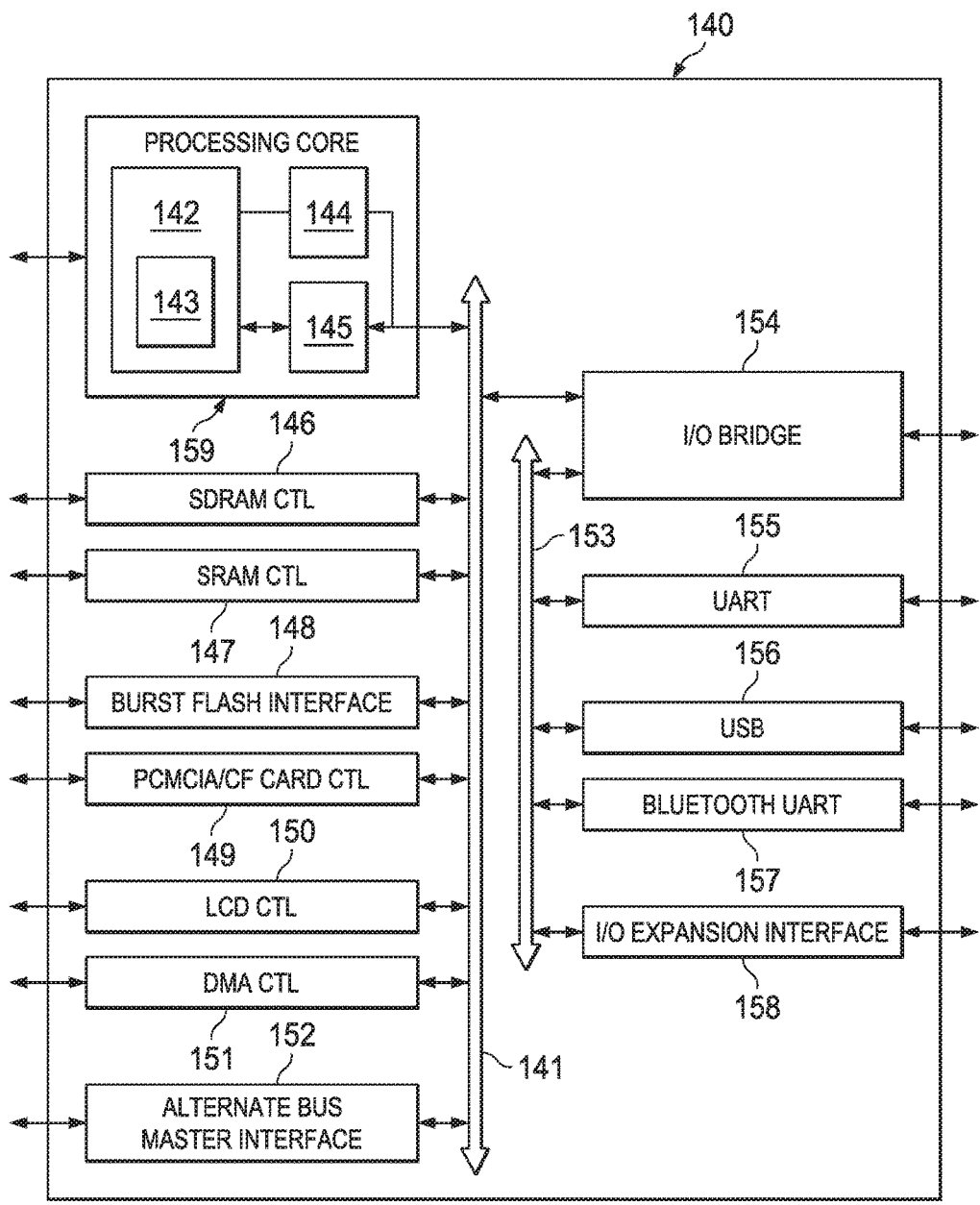
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
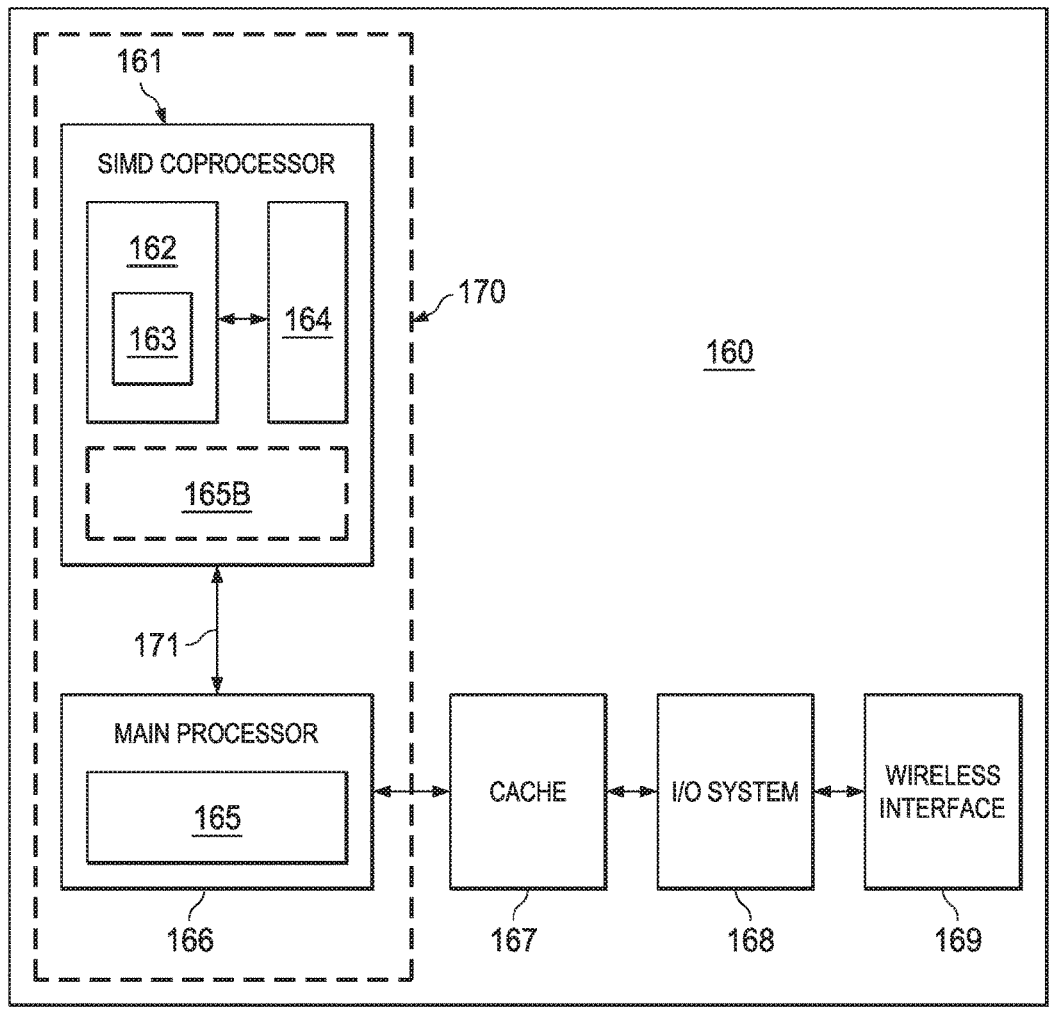
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
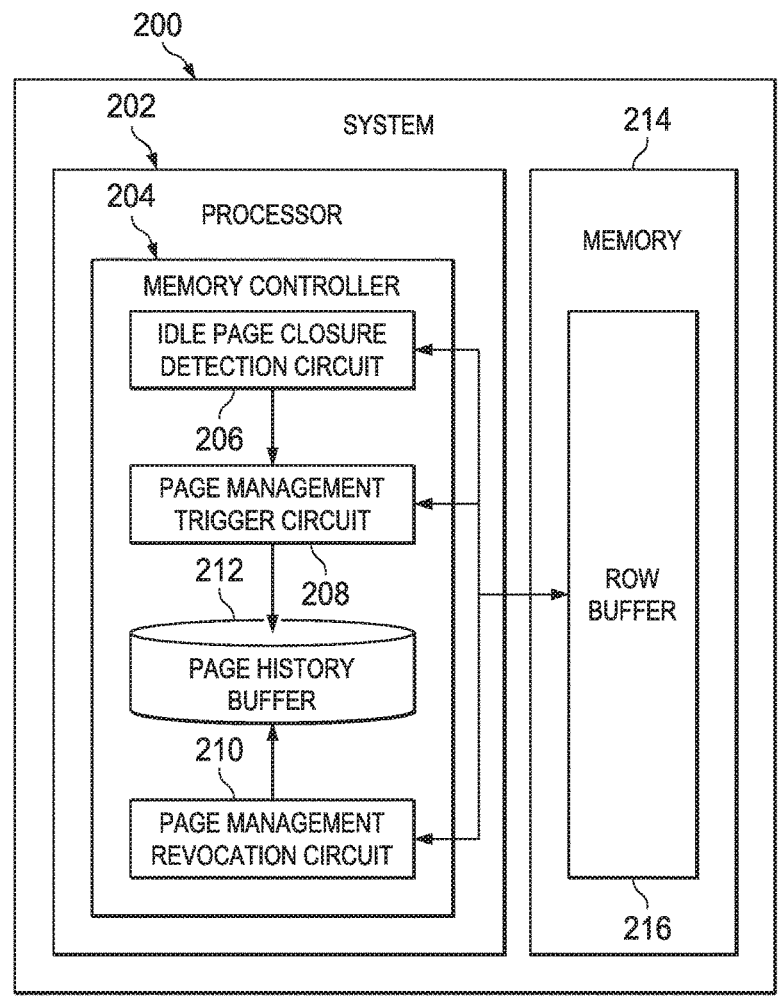
FIG. 2 is a block diagram of a system with a page aware memory controller in accordance with embodiments of the present disclosure.

FIG. 2 is a block diagram of a system 200 with a page aware memory controller in accordance with embodiments of the present disclosure. Many computer systems use DRAM as physical memory to store blocks of instructions or data to be executed by a processor. A DRAM memory may be logically or physically organized into hierarchical subdivisions. For example, a memory controller on a processor may be connected to one or more memory "channels." Each channel may have one or more associated physical memory units, such as dual in-line memory modules ("DIMMs"). A DIMM may include one or more groups of physical memory chips known as "ranks." Each rank may include one or more of the physical memory "chips" on a DIMM. Chips may be logically subdivided into "banks." Each bank may be further subdivided into "rows." When a piece of data in a bank needs to be accessed, an entire row or "page" worth of data (4-8 KB) is brought into a row buffer. In many computer systems, requests to distinct pages within a bank of memory are serialized because only one page may be kept open in a bank at a time, and read/write accesses may only be performed on an open page. Subsequent accesses to data in the open page can be served from the row buffer and incur much lower latency than an access to a closed paged. When a request to a non-open page is serviced, if another page is open at the corresponding bank, the memory controller first closes the currently open page (e.g., by using a "precharge" command) and then opens the desired page (e.g., by using an "activate" command). On the other hand, if no page is currently open at the corresponding bank, the memory controller opens the desired page (e.g., by using an "activate" command). Timing constraints for both of these are dictated by the time taken for different DRAM internal operations.

One scheduling optimization to reduce average latency is to monitor the duration for which an open page is idle (i.e., the duration for which no subsequent reads/writes occur to it), and then automatically close it upon expiration of a timer, with the hope that the precharge latency can be hidden in the event that a new request to a different page arrives. If this happens, it is known as a timely/good idle page closure. However, such an idle page closure may occur too soon. For example, another request may arrive to the now-closed page, causing an otherwise unnecessary activate latency. This may be referred to as a premature idle page closure. On the other hand, if the idle page closure is too late, then a precharge latency for a request to a non-open page can no longer be hidden. This may be referred to as an overdue idle page close. Prior solutions focused on global history-based information to adjust this timeout. For example, some implementations used a hill climbing mechanism to minimize the number of premature and overdue idle page closes. Such solutions do not consider per page history information.

In some embodiments of the present disclosure, a memory controller tracks the behavior of individual pages to determine, on a per-page basis, when and whether to evict a page from a row buffer. In such embodiments, the memory controller may take advantage of the fact that pages that fall victim to premature idle page closure are likely to do so again in the future given that such pages tend to be targeted by a number of back-to-back accesses. In some embodiments of present disclosure, the memory controller may optimize the number of row buffer hits by maintaining information about DRAM pages so that idle pages can be kept open for an optimal amount of time. Specifically, in some embodiments of the present disclosure, the memory controller may minimize the number of premature idle page closes without incurring an increased number of overdue idle page closes System 200 may include processor 202. Processor 202 may include features that are similar to processor 102, which is discussed above with reference to FIGS. 1A-1C. System 200 may include memory 214. Memory 214 may include random access memories (RAMs) such as dynamic random access memories (DRAMs), static random access memories (SRAMs), or any other suitable type of memory. Memory 214 may include row buffer 216. Row buffer 216 may operate to receive data to be written from a memory controller to a memory and to store data to be read from a memory to a memory controller.

Processor 202 may further include memory controller 204. Memory controller 204 may be coupled to a memory 214. For example, memory controller 204 may be coupled such that data may be written to or read from row buffer 216 within memory 214. Memory controller 204 may include circuitry or logic to implement page management using local page information. For example, memory controller 204 may include an idle page closure detection circuit 206, a page management trigger circuit 208, a revocation circuit 210, and a page history buffer 212. As described in further detail with reference to FIG. 3, idle page closure detection circuit 206 may include circuitry or logic to determine whether an idle page closure was a premature idle page closure. If idle page closure detection circuit 206 determines that an idle page close was a premature idle page close, idle page closure detection circuit 206 may transmit the identity of the prematurely closed page to page management trigger circuit 208. As described below with reference to FIG. 4, page management trigger circuit 208 may include circuitry or logic to determine whether a prematurely closed page qualifies for idle page closure management. If page management trigger circuit 208 determines that a page qualifies for idle page closure management, page management trigger circuit 208 may enter data identifying the page into page history buffer 212. As described in further detail with reference to FIG. 5, revocation circuit 210 may include circuitry or logic to, from time to time, evict entries from page history buffer 212 to avoid preserving stale entries. A stale entry may include an identifier of a page that is unlikely to be closed prematurely due to an idle page close. For example, stale pages may include pages that a memory controller has not accessed for a time exceeding a predetermined threshold, pages that have been subject to a number of overdue idle page closures exceeding a predetermined threshold, or any other page where exemption from idle page closures may not improve memory controller latency or performance.

Memory controller 204 may include circuitry or logic to determine whether a page should be subject to an idle page closure. For example, before closing an idle page, memory controller 204 may determine whether an identifier of the open page is entered in page history buffer 212. If an identifier of the open page is entered into page history buffer 212, memory controller 204 may refrain from closing the page, at least until a request for another page is received. Page history buffer 212 may include any suitable circuitry to store page identifiers and to enable memory controller 204 to determine the contents of page history buffer 212. For example, page history buffer 212 may include an associative cache, a direct mapped cache, or any other suitable circuitry or logic.

Figure 3:
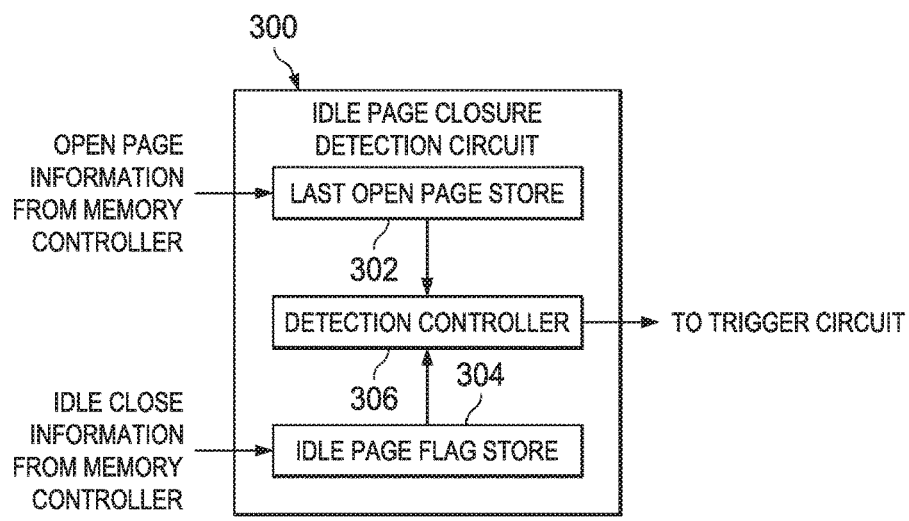
FIG. 3 is a block diagram of an idle page closure detection circuit in accordance with embodiments of the present disclosure.

FIG. 3 is a block diagram illustrating an idle page closure detection circuit in accordance with embodiments of the present disclosure. Idle page closure detection circuit 300 may have features similar to those of idle page closure detection circuit 206, which is discussed above with reference to FIG. 2. Idle page closure detection circuit 300 may include circuitry or logic to determine whether a page has experienced a premature idle page close. Idle page closure detection circuit 300 may include circuitry or logic to determine whether an incoming request targets a page that was closed due to an idle page closure. For example, idle page closure detection circuit may include last open page store 302. Last open page store 302 may store, for each bank in a memory, data representing the identity of the page that was most recently open. Such information may be stored in a cache, register, buffer, or any other suitable circuit for storing data. In some embodiments, last open page store 302 may receive information about the currently open page from a memory controller, and may record that information to identify the page as the last open page.

Idle page closure detection circuit 300 may further include idle page closure flag store 304. Idle page closure flag store 304 may store a signal, for each bank in a memory, indicating whether the most recent page closure in the bank was due to an idle page closure. For example, idle page flag store 304 may include a single bit flag, a multi-bit flag, or any other suitable indicator. Such a flag or indicator may be stored in a cache, register, buffer, or any other suitable circuit for storing data. In some embodiments, a memory controller may transmit idle page closure information to idle page closure flag store 304. Idle page closure flag store 304 may record the received information.

Idle page closure detection circuit 300 may include a detection controller 306. Detection controller 306 may include circuitry or logic to monitor an incoming access request and to determine whether the request targets a page that was prematurely closed due to an idle page closure. For example, detection controller 306 may include circuitry to determine whether a page is currently open in a row buffer. If there is no page currently open, detection controller may determine whether the previously page was closed due to an idle page closure. For example, detection controller 306 may read a flag corresponding to the row buffer from idle page flag store 304. Furthermore, circuity or logic in detection controller 306 may determine whether the current request targets the same page as the most recently closed page. For example, detection controller 306 may include circuitry or logic to read an identity of a last open page from last open page store 302. Detection controller 306 may further include circuitry or logic to compare the identity of the last opened page to identity of the page targeted by the incoming request. Detection controller 306 may include circuitry to determine that an idle page closure was premature if there is no open page, the last page close was due to an idle page closure, and the last open page is the same as the page address by the incoming request. Detection controller 306 may further include circuitry or logic to, based upon the determination that an idle page closure was premature, transmit a signal to a page management trigger circuit indicating the identity of the prematurely closed page. Detection controller 306 may be implemented by simple logic gates, including comparators, buffers, and a logical state machine, or any other suitable circuitry or logic.

Figure 4:
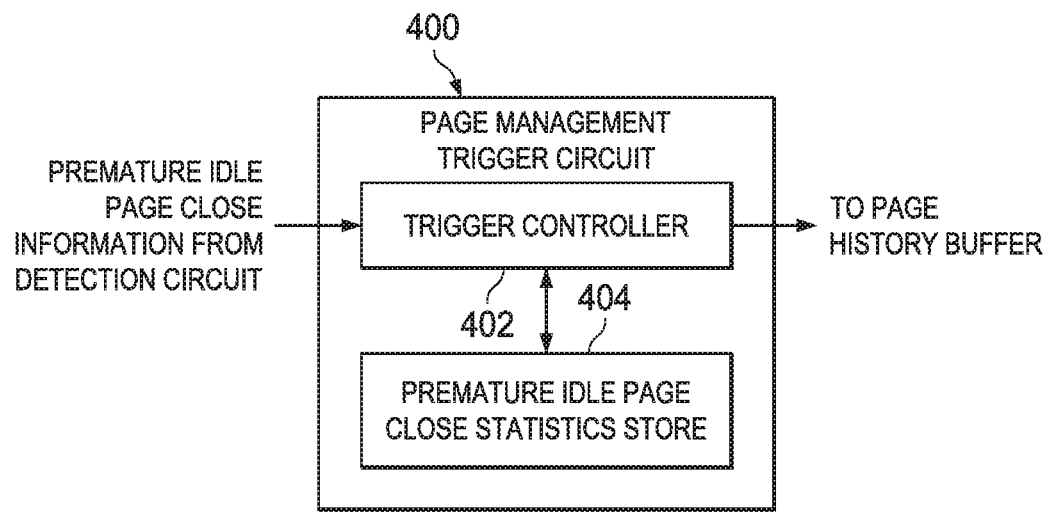
FIG. 4 is a block diagram of a page management trigger circuit in accordance with embodiments of the present disclosure.

FIG. 4 is a block diagram illustrating a page management trigger circuit 400 in accordance with embodiments of the present disclosure. Page management trigger circuit 400 may include features similar to those of page management trigger circuit 208, which is described above with reference to FIG. 2. Page management trigger circuit 400 may include trigger controller 402 and premature idle page closure statistics store 404. Trigger controller 402 may include circuitry or logic to receive premature idle page close information from an idle page closure detection circuit, such as idle page closure detection circuit 300. In some embodiments, trigger controller 402 may include circuitry or logic to track the frequency or the number of times that particular pages are prematurely closed. For example, trigger controller 402 may count instances of premature idle page closures for a particular page by incrementing a counter in premature idle page closure statistics store 404. Premature idle page close statistics store 404 may include circuitry or logic to associate identifiers of particular pages with statistics about how frequently or how many times such pages have been prematurely closed. In some embodiments, premature idle page closure statistics store 404 may be an associative cache.

In response to receiving an indication that a page has experienced a premature idle page closure, trigger controller 402 may determine whether the page should, at least temporarily, be exempt from future idle page closes. For example, in some embodiments, trigger controller 402 may determine whether a count of premature idle page closures associated with the page has exceeded a predetermined threshold. Trigger controller 402 may further include circuitry or logic to, in response to a determination that a page should be exempt from future idle page closures, transmit an identifier of the page to a page history buffer (such as page history buffer 212, discussed above with reference to FIG. 2). In some embodiments, an identifier of the page may include data representing an address of a page within a physical memory. In other embodiments, an identifier of the page may include data representing a page number, rather than a complete address of the bank, rank, and channel where the page is stored. As an operating system page may be distributed across one or more banks in a physical memory, allowing for such page aliased addressing may help improve the storage density of a page history by allowing fewer bits to be stored for each page.

In some embodiments, trigger controller 402 may determine that, if a page experiences one premature idle page closure, then the page should be exempt, at least temporarily, from future idle page closures (i.e., the predetermined threshold may be 1). In such embodiments, premature idle page close statistics store 404 may be omitted, and upon receiving an indication that a page has been identified as being subject to a premature idle page closure, trigger controller 402 may transmit data representing the identity of the page to the page history buffer.

Figure 5:
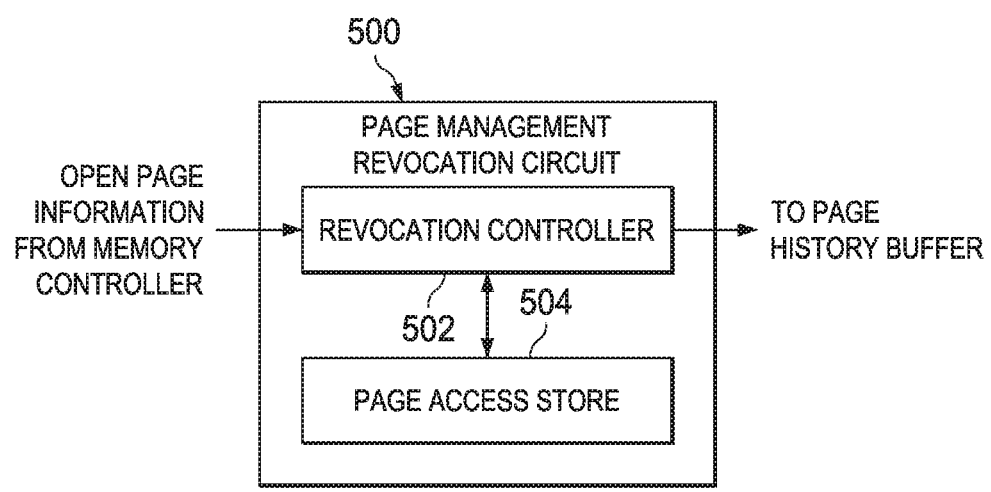
FIG. 5 is a block diagram of a page management revocation circuit in accordance with embodiments of the present disclosure.

FIG. 5 is a block diagram illustrating a revocation circuit in accordance with embodiments of the present disclosure. Revocation circuit 500 may include features similar to those of revocation circuit 210, which is discussed above with reference to FIG. 2. Revocation circuit 500 may include circuitry or logic to prune out stale entries from the history buffer, or entries that are unlikely to reduce overall system latency. Accordingly, revocation circuit 500 may include revocation controller 502. Revocation controller 502 may include circuitry or logic to determine that an entry is to be removed from a page history buffer. In some embodiments, revocation controller 502 may include circuitry or logic to select a random entry to be evicted from a page history buffer. It has been observed that a random eviction circuit may perform well and is also simple in terms of implementation complexity. However, more complex policies are also possible. For example, revocation circuit 500 may include page access store 504. Page access store 504 may include circuitry or logic to store information for use in identifying which page(s) should be evicted from a page history buffer. For example, page access store 504 may include a first-in-first-out (FIFO) buffer to evict pages in the order that they are added to a page history buffer. In another example, page access store 504 may include circuitry or logic to track which page in a page history buffer was least recently used, and to evict that page when a new page is added. In some embodiments, page access store 504 may include circuitry or logic to proactively clear low confidence or redundant entries. For example, page access store 504 may include circuitry or logic to determine when a page in the history buffer becomes overdue or is never a candidate for idle page closure.

Figure 6:
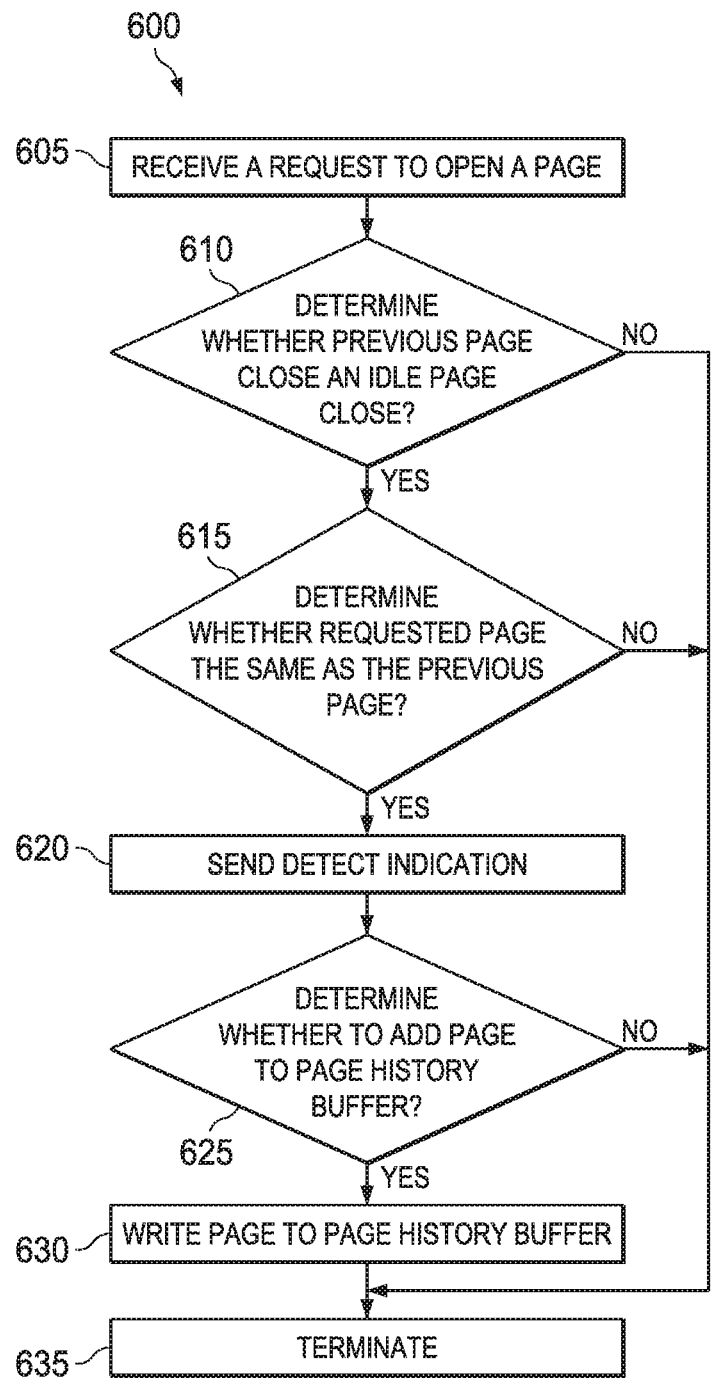
FIG. 6 is a flow chart illustrating a method for maintaining data in a page history buffer, in accordance with embodiments of the present disclosure.

FIG. 6 is a flow chart illustrating a method 600 for maintaining data in a page history buffer, in accordance with embodiments of the present disclosure. Method 600 may be implemented by any of the elements shown in FIGS. 1-5. Method 600 may be initiated by any suitable criteria and may initiate operation at any suitable point. In one embodiment, method 600 may initiate operation at 605. Method 600 may include greater or fewer steps than those illustrated. Moreover, method 600 may execute its steps in an order different than those illustrated below. Method 600 may terminate at any suitable step. Moreover, method 600 may repeat operation at any suitable step. Method 600 may perform any of its steps in parallel with other steps of method 600, or in parallel with steps of other methods.

At 605, a memory controller may receive a request to open a page in a memory. For example, an application running on a processor (such as processor 202, discussed with reference to FIG. 2), may request access to a portion of memory (such as memory 214).

At 610, a memory controller may determine whether a previous page close was an idle page close. For example, a memory controller may include an idle page closure detection circuit, such as idle page closure detection circuit 300, discussed above with reference to FIG. 3. An idle page closure detection circuit may include circuitry or logic for determining whether the last page close was an idle page close. If the last page close was an idle page close, method 600 may proceed to 615. Otherwise, method 600 may proceed to 635, after which it may terminate or repeat.

At 615, a memory controller may determine whether the requested page is the same as the previously closed page. For example, a memory controller may include an idle page closure detection circuit, such as idle page closure detection circuit 300, discussed above with reference to FIG. 3. An idle page closure detection circuit may include circuitry or logic for comparing the requested page to the last page that was opened. If the last page is the same as the requested page, method 600 may proceed to 620. Otherwise, method 600 may proceed to 635, after which it may terminate or repeat.

At 620, a memory controller may send a detect indication. For example, a memory controller may include an idle page closure detection circuit, such as idle page closure detection circuit 300, discussed above with reference to FIG. 3. An idle page closure detection circuit may include circuitry or logic to send an indication that a page closure was a premature idle page closure. For example, an idle page closure detection circuit may send data to a page management trigger circuit, such as page management trigger circuit 400, discussed above with reference to FIG. 4.

At 625, a memory controller may determine whether a page should be added to a page history buffer. For example, a memory controller may include a page management trigger circuit, such as page management trigger circuit 400, discussed above with reference to FIG. 4. A page management trigger circuit may include circuitry or logic to determine whether to add a page to a page history buffer. For example, in some embodiments, a page management trigger circuit may track the number of premature idle page closures associated with a particular page. If the number of premature closures exceeds a predetermined threshold, a page may be added to a page history buffer. Accordingly, if a page should be added to page history buffer, method 600 may proceed to 630. Otherwise method 600 may proceed to 635, after which it may terminate or repeat.

At 630, a memory controller may add a page to a page history buffer. For example, a memory controller may include a page management trigger circuit, such as page management trigger circuit 400, discussed above with reference to FIG. 4. A page management trigger circuit may include circuitry or logic to add an identifier representing a page to a page history buffer. For example, a page management trigger circuit may write a page address to a cache within a page history buffer. Method 600 may proceed to 635, after which it may terminate or repeat.

Figure 7:
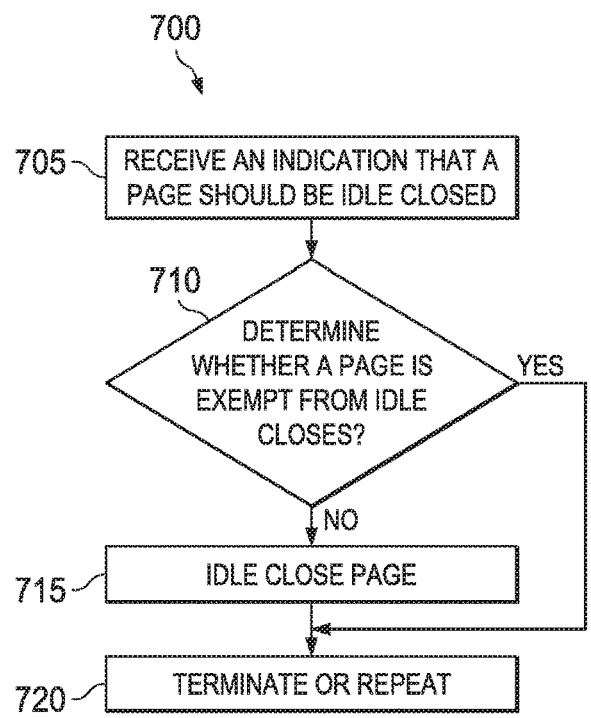
FIG. 7 is a flow chart illustrating a method for determining whether to perform an idle page close, in accordance with embodiments of the present disclosure.

FIG. 7 is a flow chart illustrating a method for determining whether to perform an idle page closure, in accordance with embodiments of the present disclosure. Method 700 may be implemented by any of the elements shown in FIGS. 1-6. Method 700 may be initiated by any suitable criteria and may initiate operation at any suitable point. In one embodiment, method 700 may initiate operation at 705. Method 700 may include greater or fewer steps than those illustrated. Moreover, method 700 may execute its steps in an order different than those illustrated. Method 700 may terminate at any suitable step. Moreover, method 700 may repeat operation at any suitable step. Method 700 may perform any of its steps in parallel with other steps of method 700, or in parallel with steps of other methods.

At 705, a memory controller may receive an indication from a memory controller that an open page should be closed because it has been idle. For example, a page may have been open and idle for a time exceeding a predetermined threshold.

At 710, a memory controller may determine whether the page is exempt from idle page closures. For example, a memory controller may read data from a page history buffer to determine whether a page is stored in the page history buffer. If data representing the page identifier is stored in the buffer, the page may be exempt from idle page closes, at least temporarily, and method 700 may proceed to 720, after which it may terminate or repeat. Otherwise, method 700 may proceed to 715.

At 715, a memory controller may close the page. For example, a memory controller may send a precharge signal to the memory where the page is located. Method 700 may then proceed to 720, after which it may terminate or repeat.

Figure 8:
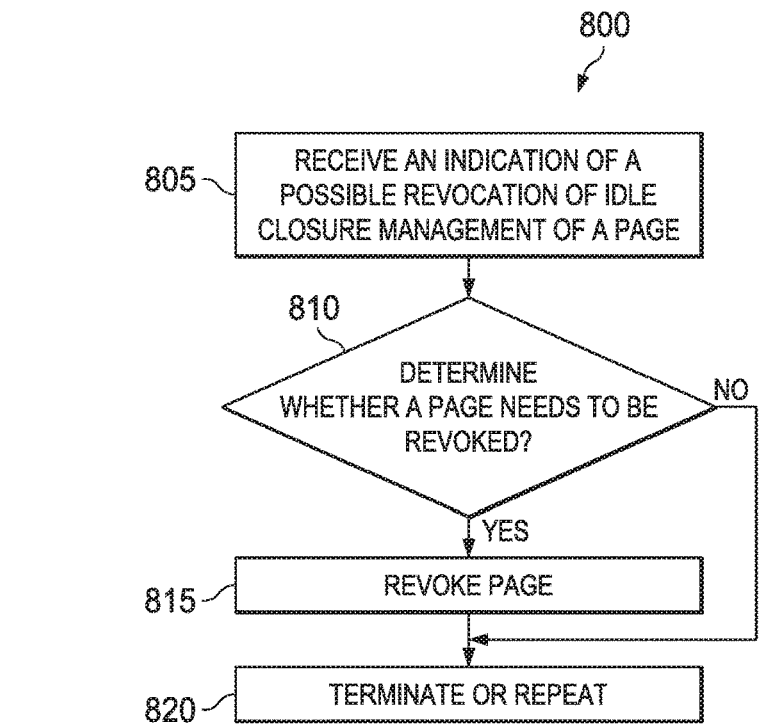
FIG. 8 is a flow chart illustrating a method for revoking idle page closure management of a page, in accordance with embodiments of the present disclosure.

FIG. 8 illustrates a flowchart of a method for revoking idle page closure management of a page, in accordance with embodiment of the present disclosure. Method 800 may be implemented by any of the elements shown in FIGS. 1-7. Method 800 may be initiated by any suitable criteria and may initiate operation at any suitable point. In one embodiment, method 800 may initiate operation at 805. Method 800 may include greater or fewer steps than those illustrated. Moreover, method 800 may execute its steps in an order different than those illustrated below. Method 800 may terminate at any suitable step. Moreover, method 800 may repeat operation at any suitable step. Method 800 may perform any of its steps in parallel with other steps of method 800, or in parallel with steps of other methods.

At 805, a memory controller may receive an indication of a possible revocation of idle page closure management of a page. For example, a new page may have been added to a page history buffer, a periodic timer may have reached the end of a fixed period, or a non-periodic timer may have reached the end of a cycle. Additionally, the memory controller may determine that a particular page that is subject to idle page closure management has not been accessed for a time exceeding a predetermined threshold. In some embodiments, the memory controller may receive such a signal from an operating system, or from other processor firmware. In some embodiments, such a signal may be internally generated by the memory controller.

At 810, the memory controller may determine whether a page needs to be revoked. For example, the memory controller may include a revocation circuit, such as revocation circuit 500, discussed above with reference to FIG. 5. A revocation circuit may include circuitry or logic to determine whether a page should be removed from the history buffer. In some embodiments, a revocation circuit may randomly revoke pages when a new page is added. In some embodiments, a revocation circuit may track whether a page has been accessed within a predetermined time interval. If not, such a page may be revoked. If a page needs to be revoked, method 800 may proceed to 815. Otherwise, method 800 may proceed to 820, after which it may terminate or repeat.

At 815, a page may be revoked. A page may be revoked by overwriting page information in a page history buffer, by clearing page information from a page history buffer, by modifying data associated with a page in a page history buffer, or by any other suitable mechanism. Method 800 may then proceed to 820, after which it may terminate or repeat.

The figures described below include detailed examples of architectures and systems to implement embodiments of the hardware components and/or instructions described above. In some embodiments, one or more hardware components and/or instructions described above may be emulated as described in detail below, or may be implemented as software modules.

Example Core Architectures, Processors, and Computer Architectures

Processor cores may be implemented in different ways, for different purposes, and in different processors. For instance, in various embodiments, such cores may include a general purpose in-order core intended for general-purpose computing, a high-performance general purpose out-of-order core intended for general-purpose computing, and/or a special purpose core intended primarily for graphics and/or scientific computing (e.g., high throughput computing). In various embodiments, different processors may include a CPU, including one or more general purpose in-order cores intended for general-purpose computing and/or one or more general purpose out-of-order cores intended for general-purpose computing, and a coprocessor, including one or more special purpose cores intended primarily for graphics and/or scientific computing (e.g., high throughput computing). Such different processors may lead to different computer system architectures, in different embodiments. For example, in some embodiments, a coprocessor may be on a separate chip than a CPU. In other embodiments, a coprocessor may be on a separate die than a CPU, but may be in the same package as the CPU. In some embodiments, a coprocessor may be on the same die as a CPU. In this case, the coprocessor may sometimes be referred to as special purpose logic, which may include integrated graphics and/or scientific logic (e.g., high throughput logic), or as a special purpose core. In some embodiments, a system on a chip may include, on the same die, a CPU as described above (which may be referred to as the application core(s) or application processor(s)), a coprocessor as described above, and additional functionality. Example core architectures, processors, and computer architectures are described below, according to some embodiments.

Example Core Architectures

In-Order and Out-of-Order Core Block Diagram

Figure 9A:
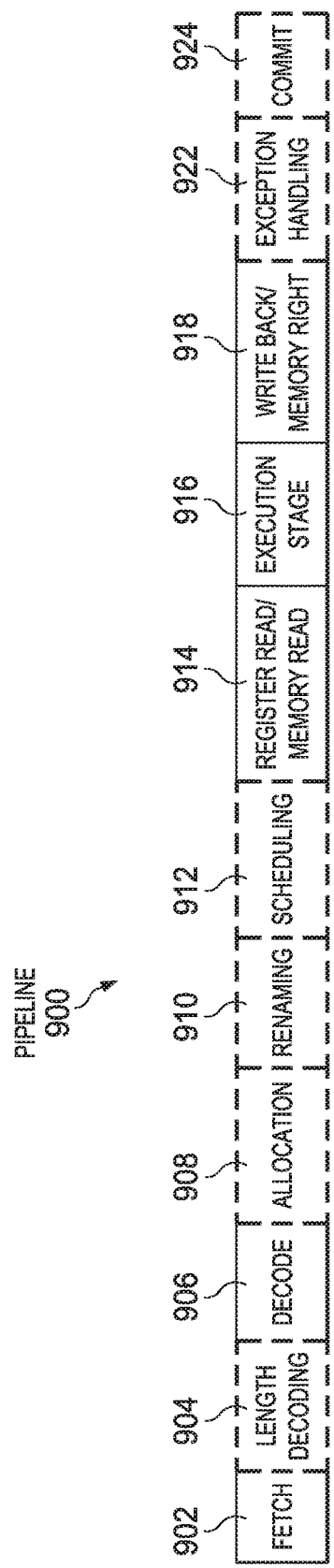
FIG. 9A is a block diagram illustrating an in-order pipeline and a register renaming, out-of-order issue/execution pipeline, according to some embodiments of the present disclosure.
Figure 9B:
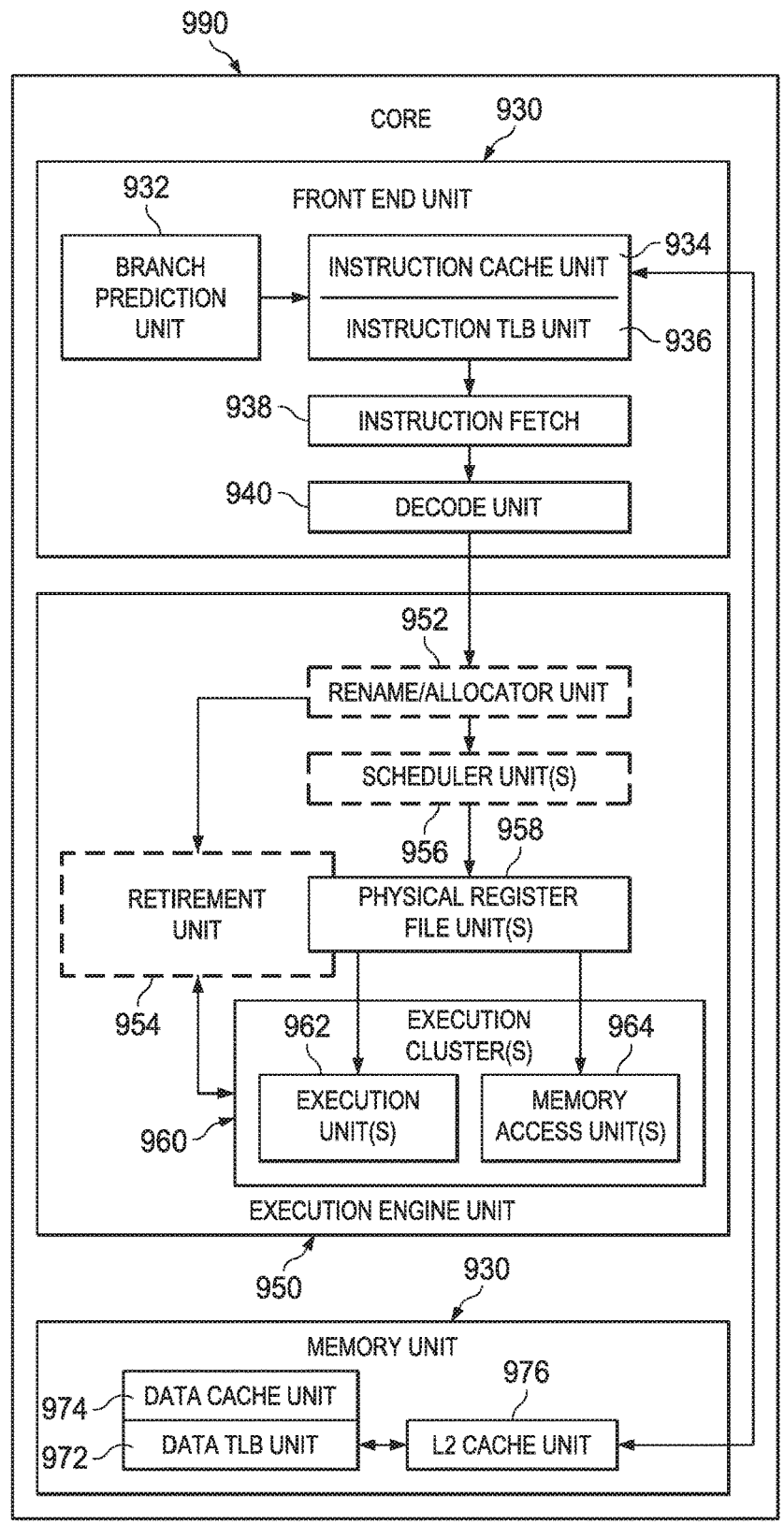
FIG. 9B is a block diagram illustrating an in-order architecture core and register renaming, out-of-order issue/execution logic to be included in a processor, according to some embodiments of the present disclosure.

FIG. 9A is a block diagram illustrating an example in-order pipeline and a register renaming, out-of-order issue/execution pipeline, according to some embodiments. FIG. 9B is a block diagram illustrating an in-order architecture core and register renaming, out-of-order issue/execution logic to be included in a processor, according to some embodiments. The solid lined boxes in FIG. 9A illustrate the in-order pipeline, while the dashed lined boxes illustrate the register renaming, out-of-order issue/execution pipeline. Similarly, the solid lined boxes in FIG. 9B illustrate the in-order architecture logic, while the dashed lined boxes illustrate the register renaming logic and out-of-order issue/execution logic In FIG. 9A, a processor pipeline 900 includes a fetch stage 902, a length decoding stage 904, a decode stage 906, an allocation stage 908, a renaming stage 910, a scheduling stage 912 (also known as a dispatch or issue stage), a register read/memory read stage 914, an execution stage 916, a write back/memory write stage 918, an exception handling stage 922, and a commit stage 924.

In FIG. 9B, arrows denote a coupling between two or more units and the direction of the arrow indicates a direction of data flow between those units. In this example, FIG. 9B illustrates a processor core 990 including a front end unit 930 coupled to an execution engine unit 950, both of which may be coupled to a memory unit 970. The core 990 may be a reduced instruction set computing (RISC) core, a complex instruction set computing (CISC) core, a very long instruction word (VLIW) core, or a core of a hybrid or alternative core type, in different embodiments. In various embodiments, core 990 may be a special-purpose core, such as, for example, a network core, a communication core, a compression engine, a coprocessor core, a general-purpose computing graphics processing unit (GPGPU) core, a graphics core, or another type of special-purpose core.

In this example, front end unit 930 includes a branch prediction unit 932 coupled to an instruction cache unit 934. Instruction cache unit 934 may be coupled to an instruction translation lookaside buffer (TLB) 936. TLB 936 may be coupled to an instruction fetch unit 938, which may be coupled to a decode unit 940. Decode unit 940 may decode instructions, and may generate as an output one or more micro-operations, micro-code entry points, microinstructions, other instructions, or other control signals, which are decoded from, or which otherwise reflect, or are derived from, the original undecoded instructions. Decode unit 940 may be implemented using any of a variety of suitable mechanisms, in different embodiments. Examples of suitable mechanisms may include, but are not limited to, lookup tables, hardware circuitry, programmable logic arrays (PLAs), microcode read only memories (ROMs). In one embodiment, instruction cache unit 934 may be further coupled to a level 2 (L2) cache unit 976 in memory unit 970. In one embodiment, the core 990 may include a microcode ROM or other medium that stores microcode for certain macroinstructions (e.g., within decode unit 940 or elsewhere within the front end unit 930). The decode unit 940 may be coupled to a rename/allocator unit 952 within the execution engine unit 950.

In this example, execution engine unit 950 includes the rename/allocator unit 952, which may be coupled to a retirement unit 954 and a set of one or more scheduler unit(s) 956. Scheduler unit(s) 956 may represent any number of different schedulers of various types, including those that implement reservations stations or those that implement a central instruction window. As illustrated in this example, scheduler unit(s) 956 may be coupled to physical register file unit(s) 958. Each of the physical register file units 958 may represent one or more physical register files, different ones of which store data of one or more different data types including, but not limited to, scalar integer, scalar floating point, packed integer, packed floating point, vector integer, vector floating point, or status data types. One example of the use of a status data type may be an instruction pointer that indicates the address of the next instruction to be executed. In one embodiment, a physical register file unit 958 may include a vector register unit, a write mask register unit, and a scalar register unit (not shown). These register units may provide architectural vector registers, write mask registers (e.g., vector mask registers), and general-purpose registers. In some embodiments, these registers may be similar to the registers illustrated in FIGURE QAD and described above.

In FIG. 9B, the physical register file unit(s) 958 are shown as being overlapped by the retirement unit 954 to illustrate various ways in which register renaming and out-of-order execution may be implemented. For example, in different embodiments, register renaming and out-of-order execution may be implemented using one or more reorder buffers and one or more retirement register files; using one or more future files, one or more history buffers, and one or more retirement register files; or using register maps and a pool of registers. In general, the architectural registers may be visible from the outside of the processor and/or from a programmer's perspective. The registers are not limited to any particular known type of circuit. Rather, any of a variety of different types of registers may be suitable for inclusion in core 990 as long as they store and provide data as described herein. Examples of suitable registers include, but are not limited to, dedicated physical registers, dynamically allocated physical registers using register renaming, and combinations of dedicated and dynamically allocated physical registers. In the example illustrated in FIG. 9B, retirement unit 954 and physical register file unit(s) 958 are coupled to the execution cluster(s) 960. Each of execution clusters 960 may include a set of one or more execution units 962 and a set of one or more memory access units 964. Execution units 962 may perform various operations (e.g., shifts, addition, subtraction, multiplication) and may operate on various types of data (e.g., scalar floating point, packed integer, packed floating point, vector integer, vector floating point). While some embodiments may include a number of execution units dedicated to specific functions or sets of functions, other embodiments may include only one execution unit, or may include multiple execution units all of which perform all supported functions or operations. In the example illustrated in FIG. 9B, scheduler unit(s) 956, physical register file unit(s) 958, and execution cluster(s) 960 are shown as potentially including a plurality of such units since some embodiments include separate pipelines for certain types of data/operations. For example, some embodiments may include a scalar integer pipeline, a scalar floating point/packed integer/packed floating point/vector integer/vector floating point pipeline, and/or a memory access pipeline, each of which includes its own scheduler unit, physical register file unit, and/or execution cluster. In some embodiments that include a separate memory access pipeline, only the execution cluster of this pipeline includes a memory access unit 964. It should also be understood that where separate pipelines are used, one or more of these pipelines may be out-of-order issue/execution pipelines and the rest may be in-order execution pipelines.

In the example illustrated in FIG. 9B, the set of memory access units 964 may be coupled to the memory unit 970, which includes a data TLB unit 972. Data TLB unit 972 may be coupled to a data cache unit 974, which in turn may be coupled to a level 2 (L2) cache unit 976. In one example embodiment, the memory access units 964 may include a load unit, a store address unit, and a store data unit, each of which may be coupled to the data TLB unit 972 in the memory unit 970. The L2 cache unit 976 may be coupled to one or more other levels of cache and, eventually, to a main memory. While FIG. 9B illustrates an embodiment in which instruction cache unit 934, data cache unit 974, and level 2 (L2) cache unit 976 reside within core 990, in other embodiments one or more caches or cache units may be internal to a core, external to a core, or apportioned internal to and external to a core in different combinations.

In one example embodiment, the register renaming, out-of-order issue/execution core architecture illustrated in FIG. 9B may implement pipeline 900 illustrated in FIG. 9B as follows. The instruction fetch unit 938 may perform the functions of the fetch and length decoding stages 902 and 904. The decode unit 940 may perform the functions of decode stage 906. The rename/allocator unit 952 may perform the functions of the allocation stage 908 and the renaming stage 910. The scheduler unit(s) 956 may perform the functions of the scheduling stage 912. The physical register file unit(s) 958 and the memory unit 970 may, collectively, perform the functions of the register read/memory read stage 914. The execution cluster(s) 960 may perform the functions of the execution stage 916. The memory unit 970 and the physical register file unit(s) 958 may, collectively, perform the functions of the write back/memory write stage 918. In different embodiments, various units (some of which may not be shown) may be involved in performing the functions of the exception handling stage 922. The retirement unit 954 and the physical register file unit(s) 958 may, collectively, perform the functions of the commit stage 924. In different embodiments, core 990 may support one or more instructions sets, including the instruction(s) described herein. For example, in various embodiments, core 990 may support the x86 instruction set (with or without extensions that have been included in recent versions); the MIPS instruction set of MIPS Technologies of Sunnyvale, Calif.; and/or the ARM instruction set of ARM Holdings of Sunnyvale, Calif. (with or without optional additional extensions such as NEON. In one embodiment, core 990 may include logic to support a packed data instruction set extension (e.g., AVX1 or AVX2), thereby allowing the operations used by many multimedia applications to be performed using packed data.

In some embodiments, core 990 may support multithreading (e.g., executing two or more parallel sets of operations or threads), and may do so in a variety of ways. Core 990 may, for example, include support for time sliced multithreading, simultaneous multithreading (in which a single physical core provides a logical core for each of the threads that the physical core is simultaneously executing), or a combination of time sliced and simultaneous multithreading. In one embodiment, for example, core 990 may include support for time sliced fetching and decoding, and for simultaneous multithreading in subsequent pipeline stages, such as in the Intel® Hyperthreading technology.

While register renaming is described herein in the context of out-of-order execution, it should be understood that register renaming may be used in an in-order architecture, in some embodiments. While in the example embodiment illustrated in FIG. 9B, core 990 includes separate instruction and data cache units 934 and 974, respectively, and a shared L2 cache unit 976, in other embodiments core 990 may include a single internal cache for both instructions and data, such as, for example, a Level 1 (L1) internal cache, or multiple levels of internal cache. In some embodiments, the system may include a combination of an internal cache and an external cache (e.g., a cache that is external to the core and/or the processor). In other embodiments, all of the caches may be external to the core and/or the processor.

Specific Example In-Order Core Architecture

Figure 10A:
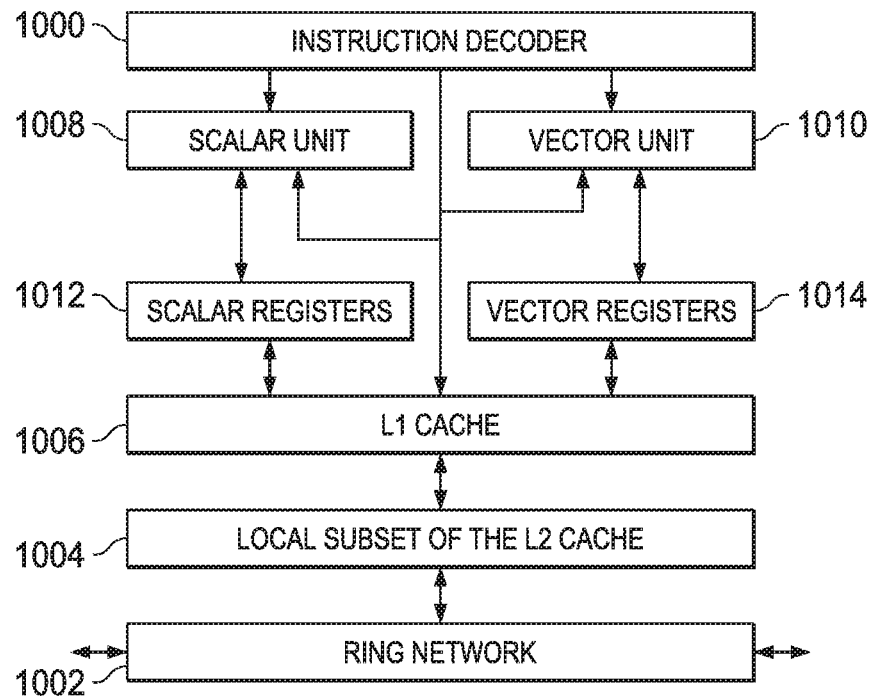
FIGS. 10A and 10B are block diagrams illustrating an example in-order core architecture, according to some embodiments of the present disclosure.
Figure 10B:
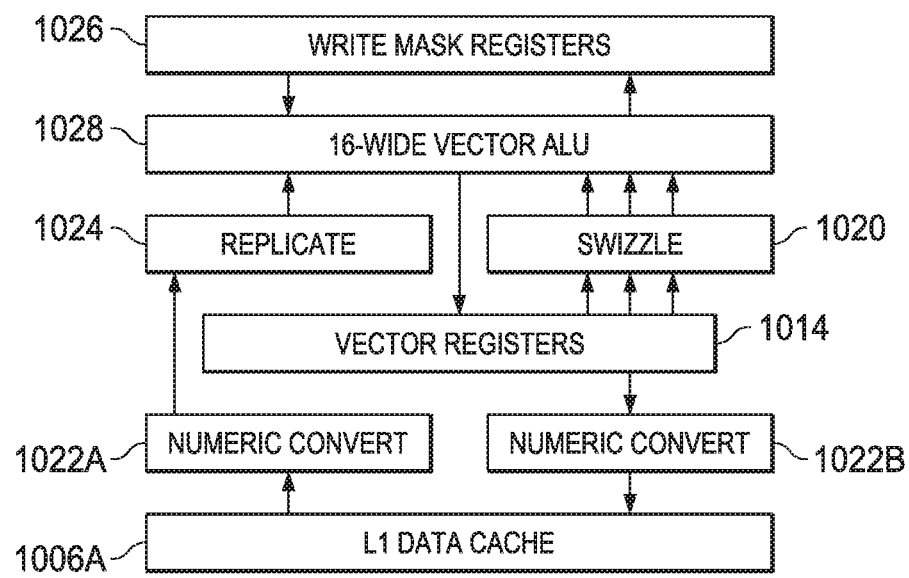

FIGS. 10A and 10B are block diagrams illustrating a more specific example of an in-order core architecture in which a core may be one of several logic blocks (including, for example, other cores of the same type and/or of different types) in a chip. As illustrated in this example, the logic blocks may communicate through a high-bandwidth, on-die interconnect network (e.g., a ring network) with some fixed function logic, memory I/O interfaces, and other necessary I/O logic, depending on the application.

FIG. 10A is a block diagram illustrating a single processor core, along with its connections to an on-die interconnect network (shown as ring network 1002) and to its local subset of a Level 2 (L2) cache 1004, according to some embodiments. In one embodiment, an instruction decoder 1000 may support the x86 instruction set with a packed data instruction set extension. An L1 cache 1006 may allow low-latency accesses to cache memory by the scalar and vector units. In one embodiment (e.g., to simplify the design), a scalar unit 1008 and a vector unit 1010 may use separate register sets (e.g., scalar registers 1012 and vector registers 1014, respectively) and data that is transferred between them may be written to memory and then read back in from level 1 (L1) cache 1006. However, other embodiments may use a different approach. For example, they may include a single register set or may include a communication path that allows data to be transferred between the two register files without being written to memory and read back.

In this example, the local subset of the L2 cache 1004 may be part of a global L2 cache that is divided into separate local subsets, e.g., with one subset per processor core. Each processor core may have a direct access path to its own local subset of the L2 cache 1004. Data read by a processor core may be stored in its L2 cache subset 1004 from which it can be accessed quickly and in parallel with accesses by other processor cores to their own local L2 cache subsets. Data written by a processor core and stored in its own L2 cache subset 1004 may be flushed from other L2 cache subsets, if necessary. In some embodiments, the ring network 1002 may ensure coherency for shared data. The ring network may be bi-directional to allow agents such as processor cores, L2 caches and other logic blocks to communicate with each other within the chip. In one embodiment, each ring datapath may be 1012 bits wide per direction.

FIG. 10B illustrates an expanded view of part of the processor core illustrated in FIG. 10A, according to some embodiments. In this example, FIG. 10B includes an L1 data cache 1006A, which may be part of the L1 cache 1004, as well as more detail regarding the vector unit 1010 and the vector registers 1014. Specifically, the vector unit 1010 may be a 16-wide vector processing unit (VPU) that includes a 16-wide vector ALU 1028. ALU 1028 may be configured to execute one or more of integer, single-precision float, and double-precision float instructions. The VPU may also support swizzling the register inputs (using swizzle unit 1020), numeric conversion (using numeric convert units 1022A and 1022B), and replication (using replication unit 1024) on the memory input. The inclusion of write mask registers 1026 may allow for predicating resulting vector writes.

Figure 11:
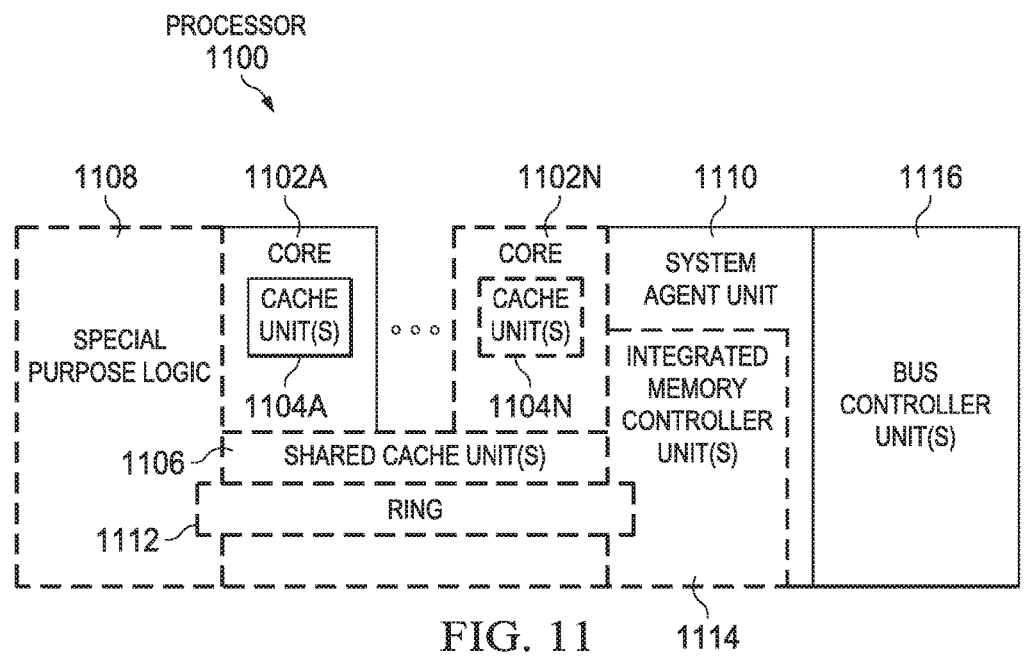
FIG. 11 illustrating a block diagram illustrating a processor, according to some embodiments of the present disclosure.

FIG. 11 is a block diagram illustrating a processor 1100 that may, in some embodiments, include more than one core, an integrated memory controller, and/or may special purpose logic (such as for integrated graphics computing). The solid lined boxes in FIG. 11 illustrate a processor 1100 that includes a single core 1102A, a system agent 1110, and a set of one or more bus controller units 1116. With the optional addition of the dashed lined boxes, an alternative embodiment of processor 1100 includes multiple cores 1102A-1102N, and also includes a set of one or more integrated memory controller unit(s) 1114 within the system agent unit 1110, and special purpose logic 1108. In some embodiments, one or more of cores 1102A-1102N may be similar to processor core 990 illustrated in FIG. 9B or the processor core illustrated in FIGS. 10A and 10B.

In some embodiments, processor 1100 may represent a CPU in which the special purpose logic 1108 includes integrated graphics and/or scientific logic (which may include one or more cores), and in which the cores 1102A-1102N include one or more general purpose cores (e.g., general purpose in-order cores, general purpose out-of-order cores, or a combination of the two). In other embodiments, processor 1100 may represent a coprocessor in which the cores 1102A-1102N include a large number of special purpose cores intended primarily for graphics and/or scientific computing (e.g., high throughput computing). In still other embodiments, processor 1100 may represent a coprocessor in which the cores 1102A-1102N include a large number of general purpose in-order cores. Thus, in different embodiments, the processor 1100 may be a general purpose processor, a coprocessor, or a special purpose processor, such as, for example, a network or communication processor, compression engine, graphics processor, GPGPU (general purpose graphics processing unit), a high-throughput "many integrated core" (MIC) coprocessor (including, for example, 30 or more cores), an embedded processor, or another type of processor. The processor 1100 may be implemented on one chip or on more than one chip, in different embodiments. The processor 1100 may be a part of and/or may be implemented on one or more substrates using any of a number of process technologies, such as, for example, BiCMOS, CMOS, or NMOS.

In the example illustrated in FIG. 11, the memory hierarchy includes one or more levels of cache within each of the cores 1102A-1102N, shown as cache units 1104A-1104N, a set of one or more shared cache units 1106, and external memory (not shown), some or all of which are coupled to the set of integrated memory controller units 1114. The set of shared cache units 1106 may include one or more mid-level caches, such as level 2 (L2) cache, a level 3 (L3) cache, a level 4 (L4) cache, other levels of cache, a last level cache (LLC), and/or combinations thereof. In one embodiment, a ring based interconnect unit 1112 may be used to interconnect the special purpose logic 1108 (which may include integrated graphics logic), the set of shared cache units 1106, and the system agent unit 1110/integrated memory controller unit(s) 1114. In other embodiments, any number of other suitable techniques may be used for interconnecting such units. In one embodiment, coherency may be maintained between one or more cache units 1106 and cores 1102A-1102N.

In some embodiments, one or more of the cores 1102A-1102N may be capable of multithreading. In some embodiments, the system agent 1110 may include circuitry or logic for coordinating and operating cores 1102A-1102N. For example, the system agent unit 1110 may include a power control unit (PCU) and a display unit. The PCU may be or include logic and circuitry for regulating the power state of the cores 1102A-1102N and the special purpose logic 1108 (which may include integrated graphics logic). The display unit may include circuitry or logic for driving one or more externally connected displays.

In various embodiments, the cores 1102A-1102N may be homogenous or heterogeneous in terms of architecture instruction set. That is, two or more of the cores 1102A-1102N may be capable of executing the same instruction set, while others may be capable of executing only a subset of that instruction set or may execute a different instruction set.

Example Computer Architectures

Figure 12:
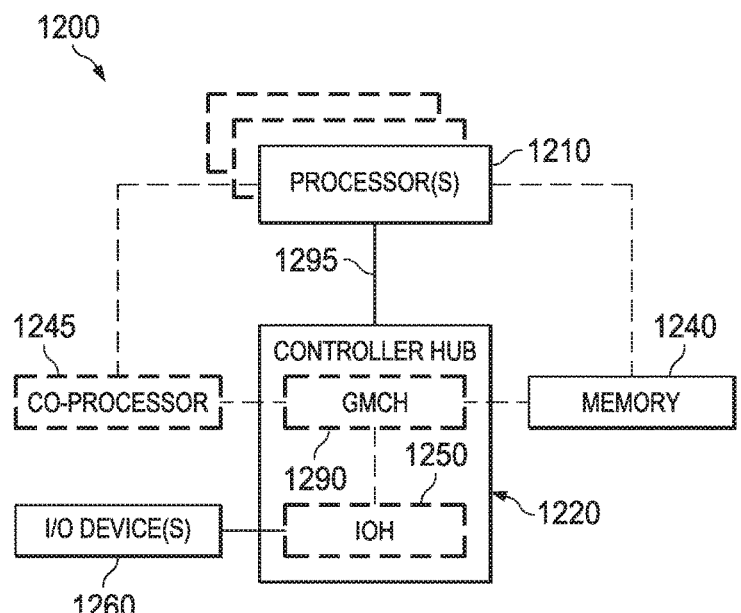
Figure 13:
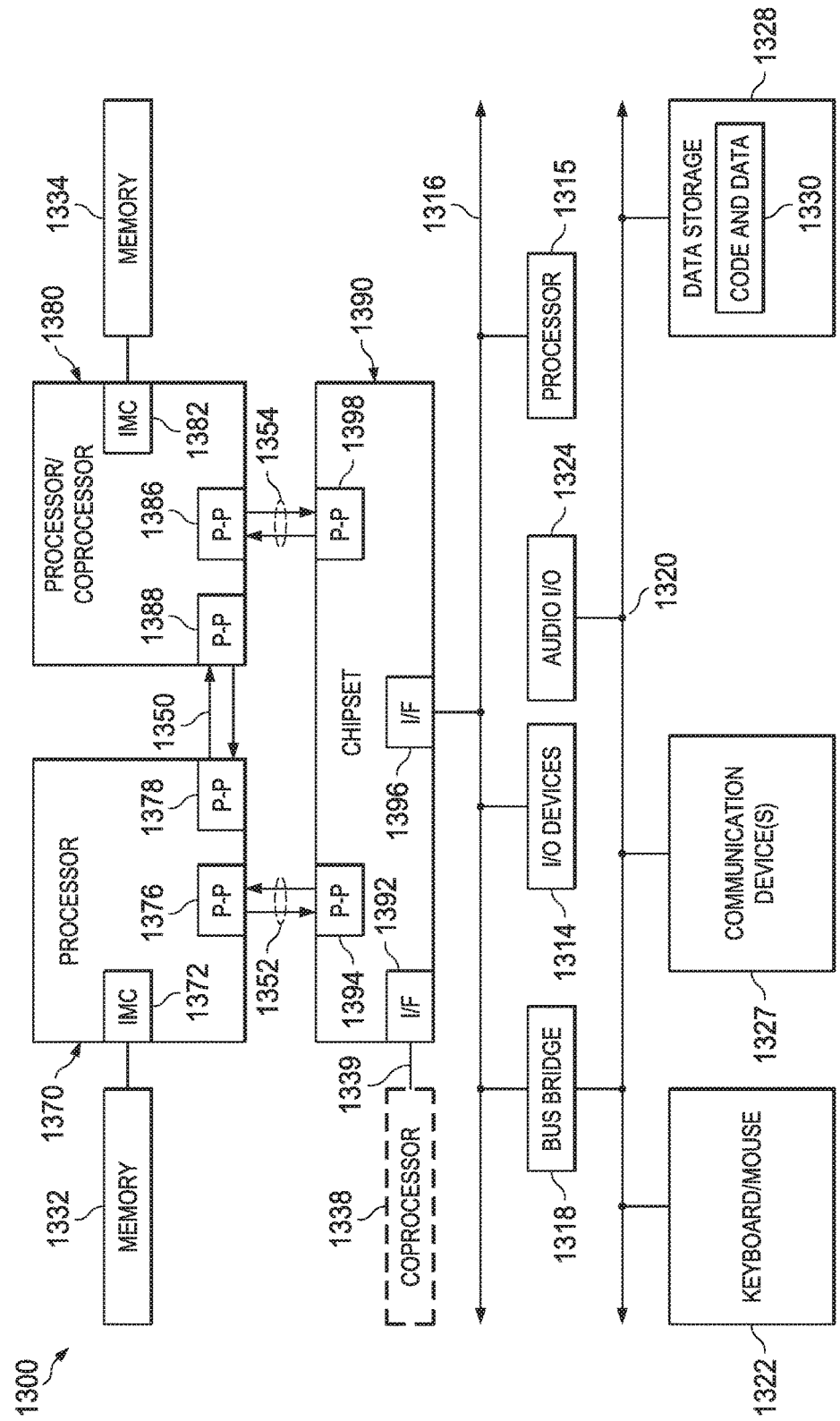
Figure 14:
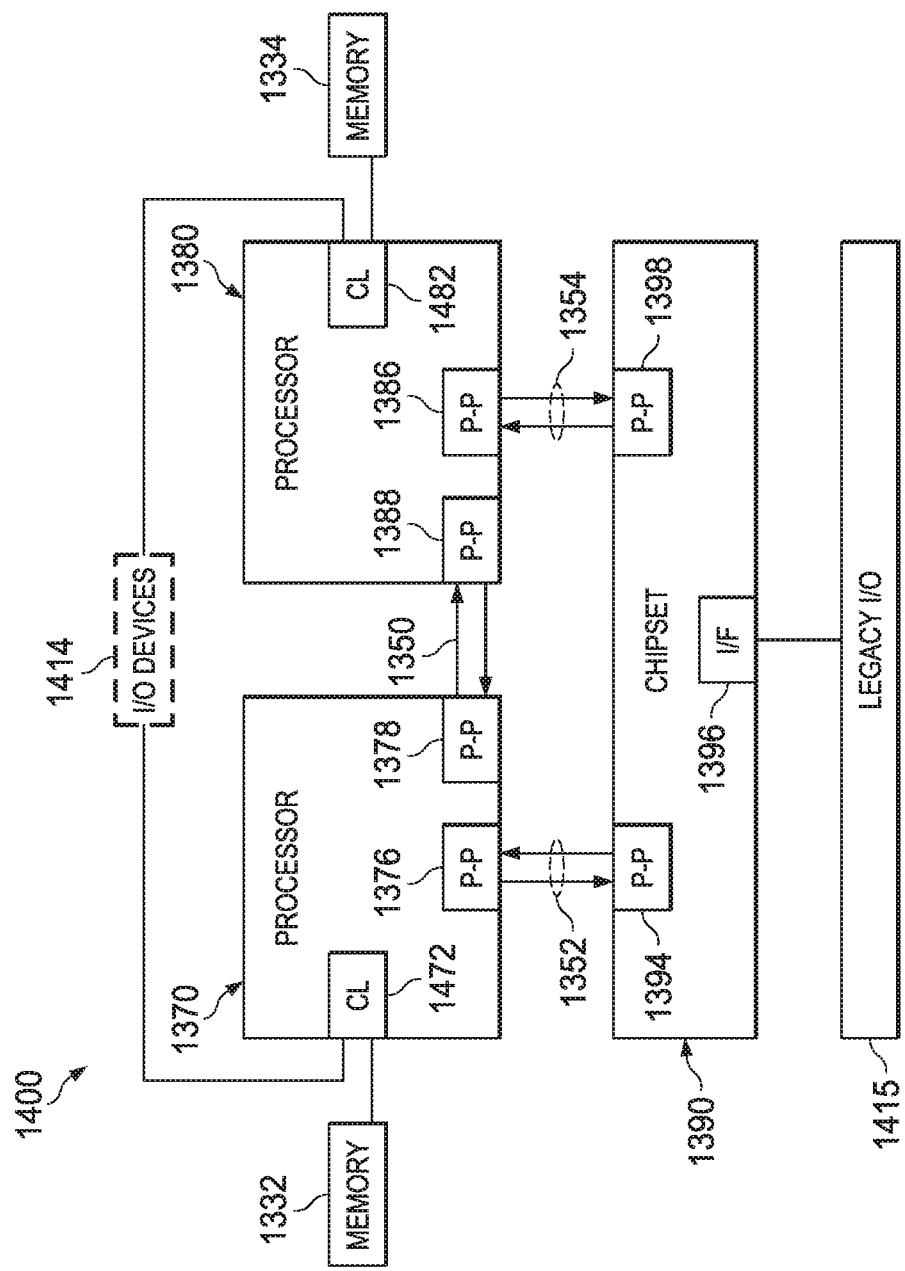

FIGS. 12 through 14 are block diagrams illustrating example systems suitable for the inclusion of one or more processors including, but not limited to, the processors described herein. FIG. 15 illustrates an example system on a chip (SoC) that may include one or more processor cores including, but not limited to, the processor cores described herein. Other system designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable for inclusion of the processors and/or processor cores described herein. In general, a huge variety of systems or electronic devices capable of incorporating a processor and/or other execution logic as disclosed herein are generally suitable for inclusion of the processors and/or processor cores described herein.

FIG. 12 is a block diagram illustrating a system 1200, in accordance with one embodiment of the present disclosure. As illustrated in this example, system 1200 may include one or more processors 1210, which are coupled to a controller hub 1220. In some embodiments, controller hub 1220 may include a graphics memory controller hub (GMCH) 1290 and an Input/Output Hub (IOH) 1250. In some embodiments, GMCH 1290 and IOH 1250 may be on separate chips. In this example, GMCH 1290 may include memory and graphics controllers (not shown) to which are coupled memory 1240 and a coprocessor 1245, respectively. In this example, IOH 1250 couples one or more input/output (I/O) devices 1260 to GMCH 1290. In various embodiments, one or both of the memory and graphics controllers may be integrated within the processor (as described herein), the memory 1240 and/or the coprocessor 1245 may be coupled directly to the processor(s) 1210, or the controller hub 1220 may be implemented in a single chip that includes the IOH 1250.

The optional nature of additional processors 1210 is denoted in FIG. 12 with broken lines. Each processor 1210 may include one or more of the processing cores described herein and may be implemented by a version of the processor 1100 illustrated in FIG. 11 and described herein.

In various embodiments, the memory 1240 may, for example, be dynamic random access memory (DRAM), phase change memory (PCM), or a combination of the two. In at least some embodiments, the controller hub 1220 may communicate with the processor(s) 1210 via a multi-drop bus such as a frontside bus (FSB), a point-to-point interface such as QuickPath Interconnect (QPI), or a similar connection, any one of which may be represented in FIG. 12 as interface 1295.

In one embodiment, the coprocessor 1245 may be a special purpose processor, such as, for example, a high-throughput MIC processor, a network or communication processor, a compression engine, a graphics processor, a GPGPU, an embedded processor, or another type of coprocessor. In one embodiment, controller hub 1220 may include an integrated graphics accelerator (not shown).

In some embodiments, there may be a variety of differences between the physical resources of different ones of the processors 1210. For example, there may be differences between the physical resources of the processors in terms of a spectrum of metrics of merit including architectural characteristics, micro-architectural characteristics, thermal characteristics, power consumption characteristics, and/or other performance-related characteristics.

In one embodiment, a processor 1210 may execute instructions that control data processing operations of a general type. Embedded within the instructions may be coprocessor instructions. The processor 1210 may recognize these coprocessor instructions as being of a type that should be executed by the attached coprocessor 1245. Accordingly, the processor 1210 may issue these coprocessor instructions (or control signals representing coprocessor instructions), on a coprocessor bus or other interconnect, to coprocessor 1245. Coprocessor(s) 1245 may accept and execute the received coprocessor instructions.

FIG. 13 is a block diagram illustrating a first example system 1300, in accordance with one embodiment of the present disclosure. As shown in FIG. 13, multiprocessor system 1300 implements a point-to-point interconnect system. For example, system 1300 includes a first processor 1370 and a second processor 1380 coupled to each other via a point-to-point interconnect 1350. In some embodiments, each of processors 1370 and 1380 may be a version of the processor 1100 illustrated in FIG. 11. In one embodiment, processors 1370 and 1380 may be implemented by respective processors 1210, while coprocessor 1338 may be implemented by a coprocessor 1245. In another embodiment, processors 1370 and 1380 may be implemented by a processor 1210 and a coprocessor 1245, respectively.

Processors 1370 and 1380 are shown including integrated memory controller (IMC) units 1372 and 1382, respectively. Processor 1370 also includes, as part of its bus controller units, point-to-point (P-P) interfaces 1376 and 1378. Similarly, processor 1380 includes P-P interfaces 1386 and 1388. Processors 1370 and 1380 may exchange information via a point-to-point (P-P) interface 1350 using P-P interface circuits 1378 and 1388. As shown in FIG. 13, IMCs 1372 and 1382 couple the processors to respective memories, shown as memory 1332 and memory 1334, which may be portions of a main memory that are locally attached to the respective processors.

Processors 1370 and 1380 may each exchange information with a chipset 1390 via individual P-P interfaces 1352 and 1354 respectively, using point to point interface circuits 1376, 1394, 1386, and 1398. Chipset 1390 may optionally exchange information with the coprocessor 1338 via interface 1392 over a high-performance interface 1339. In one embodiment, the coprocessor 1338 may be a special purpose processor, such as, for example, a high-throughput MIC processor, a network or communication processor, a compression engine, a graphics processor, a GPGPU, an embedded processor, or another type of special purpose processor. In one embodiment, coprocessor 1338 may include a high-performance graphics circuit and interface 1339 may be a high-performance graphics bus.

A shared cache (not shown) may be included in either processor or outside of both processors, yet may be connected with the processors via a P-P interconnect, such that either or both processors' local cache information may be stored in the shared cache if a processor is placed into a low power mode.

Chipset 1390 may be coupled to a first bus 1316 via an interface 1396. In various embodiments, first bus 1316 may be a Peripheral Component Interconnect (PCI) bus, a PCI Express bus, or another third generation I/O interconnect bus, although the scope of the present disclosure is not limited to these specific bus types.

As shown in FIG. 13, various I/O devices 1314 may be coupled to first bus 1316, along with a bus bridge 1318. Bus bridge 1318 may couple first bus 1316 to a second bus 1320. In one embodiment, one or more additional processor(s) 1315, such as one or more coprocessors, high-throughput MIC processors, GPGPU's, accelerators (e.g., graphics accelerators or digital signal processing (DSP) units), field programmable gate arrays, and/or any other processors, may be coupled to first bus 1316. In one embodiment, second bus 1320 may be a low pin count (LPC) bus. Various devices may be coupled to second bus 1320 including, for example, a keyboard and/or mouse 1322, one or more communication devices 1327 and a data storage unit 1328. Data storage unit 1328 may be a disk drive or another mass storage device, which may include instructions/code and data 1330, in one embodiment. In some embodiments, an audio I/O device 1324 may be coupled to the second bus 1320. Note that other architectures are possible. For example, instead of the point-to-point architecture illustrated in FIG. 13, a system may implement a multi-drop bus or another type of interconnect architecture.

FIG. 14 is a block diagram illustrating a second example system 1400, in accordance with one embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370 and 1380 may include integrated memory and I/O control logic ("CL") units 1472 and 1482, respectively. Thus, CL 1472 and CL 1482 may include integrated memory controller units and may also include I/O control logic. FIG. 14 illustrates that not only are the memories 1332 and 1334 coupled to CL 1472 and CL 1482, respectively, but I/O devices 1414 are also coupled to CL 1472 and CL 1482. In this example system, legacy I/O devices 1415 may also be coupled to the chipset 1390 via an interface 1396.

FIG. 15 is a block diagram illustrating a system on a chip (SoC) 1500, in accordance with one embodiment of the present disclosure. Similar elements in FIGS. 15 and 11 bear like reference numerals. Also, dashed lined boxes represent optional features on more advanced SoCs. In FIG. 15, one or more interconnect unit(s) 1502 are coupled to an application processor 1510, which includes a set of one or more cores 1102A-1102N, including respective local cache units 1104A-1104N, and shared cache unit(s) 1106. The interconnect unit(s) 1502 are also coupled to a system agent unit

1110, one or more bus controller unit(s) 1116, one or more integrated memory controller unit(s) 1114, a set of one or more coprocessors 1520, a static random access memory (SRAM) unit 1530, a direct memory access (DMA) unit 1532, and a display unit 1540 for coupling to one or more external displays. In one embodiment, the coprocessor(s) 1520 may include a special purpose processor, such as, for example, a network or communication processor, a compression engine, a GPGPU, a high-throughput MIC processor, an embedded processor, or another type of coprocessor. In another embodiment, the coprocessor(s) 1520 may be a media processor that includes integrated graphics logic, an image processor, an audio processor, and/or a video processor.

In various embodiments, the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and to generate output information. The output information may be applied to one or more output devices, in known fashion. For purposes of this disclosure, a processing system may include any system that includes a processor, such as, for example, a digital signal processor (DSP), a microcontroller, an application specific integrated circuit (ASIC), or a microprocessor.

In some embodiments, the program code may be implemented in a high level procedural or object oriented programming language to communicate with a processing system. The program code may also be implemented in assembly or machine language, in other embodiments. In fact, the mechanisms described herein are not limited in scope to any particular programming language. In general, the programming language may be a compiled language or an interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, sometimes referred to as "IP cores", may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable memories (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off the processor.

FIG. 16 is a block diagram illustrating the use of a compiler and a software instruction converter to convert binary instructions in a source instruction set to binary instructions in a target instruction set, according to some embodiments. In the illustrated embodiment, the instruction converter may be a software instruction converter, although in other embodiments the instruction converter may be implemented in software, firmware, hardware, or various combinations thereof. FIG. 16 illustrates that a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that may be operable to generate x86 binary code 1606 (e.g., object code) that may, with or without additional linkage processing, be executed on the processor with at least one x86 instruction set core 1616. Similarly, FIG. 16 illustrates that the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1612 may be used to convert x86 binary code 1606 into code that may be natively executed by the processor without an x86 instruction set core 1614. This converted code might not be the same as the alternative instruction set binary code 1610; however, the converted code will accomplish the general operation and be made up of instructions from the alternative instruction set. Thus, instruction converter 1612 represents software, firmware, hardware, or a combination thereof that, through emulation, simulation or any other process, allows a processor or other electronic device that does not have an x86 instruction set processor or core to execute x86 binary code 1606.

Thus, techniques for performing one or more instructions according to at least one embodiment are disclosed. While certain example embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Embodiments of the present disclosure may include a system. The system may include a processor, including a memory controller, a memory, including a row buffer, wherein the memory controller is to determine that a page stored in the row buffer has been idle for a time exceeding a predetermined threshold, determine whether the page is exempt from idle page closures; and based on a determination that the page is exempt, refrain from closing the page. In combination with any of the above embodiments, the circuitry to determine whether the page is exempt from idle page closures may include a page history buffer to store a plurality of identifiers of pages that are exempt from idle page closures; and circuitry to determine whether the plurality of identifiers of pages that are exempt from idle page closures includes an identifier of the page stored in the row buffer. In combination with any of the above embodiments, the memory controller may further include circuitry to receive a request to open a second page, and a page management trigger circuit including circuitry to determine that the row buffer is empty, determine that a most recently closed page was closed through an idle page closure, and determine that the most recently closed page is the same as the second page. In combination with any of the above embodiments, the memory controller may further include a page history buffer to store a plurality of identifiers of pages that are exempt from idle page closures, and circuitry to add an identifier for the second page to the page history buffer. In combination with any of the above embodiments, the circuitry to add the identifier may include circuitry to determine whether the second page has been subject to a number of premature idle page closures exceeding a predetermined threshold. In combination with any of the above embodiments, predetermined threshold may be 0. In combination with any of the above embodiments, the predetermined threshold may be 1. In combination with any of the above embodiments, the memory controller may further include circuitry to evict an identifier of a third page from the page history buffer based on the addition of the identifier of the second page to the page history buffer. In combination with any of the above embodiments, the identifier of the third page may be randomly selected from the plurality of identifiers of pages that are exempt from idle page closures. In combination with any of the above embodiments, the identifier of the third page may be selected from the plurality of identifiers of pages that are exempt from idle page closures based on a first-in-first-out policy.

Embodiments of the present disclosure may include a processor. The processor may include a memory controller including circuitry to determine that a page stored in the row buffer has been idle for a time exceeding a predetermined threshold, determine whether the page is exempt from idle page closures, and based on a determination that the page is exempt, refrain from closing the page. In combination with any of the above embodiments, the circuitry to determine whether the page is exempt from idle page closures may include a page history buffer to store a plurality of identifiers of pages that are exempt from idle page closures, and circuitry to determine whether the plurality of identifiers of pages that are exempt from idle page closures includes an identifier of the page stored in the row buffer. In combination with any of the above embodiments, the circuitry to add the identifier may include circuitry to determine whether the second page has been subject to a number of premature idle page closures exceeding a predetermined threshold. In combination with any of the above embodiments, the predetermined threshold may be 0. In combination with any of the above embodiments, the predetermined threshold may be 1. In combination with any of the above embodiments, the memory controller may further include circuitry to receive a request to open a second page, and a page management trigger circuit including circuitry to determine that the row buffer is empty, determine that a most recently closed page was closed through an idle page closure, and determine that the most recently closed page is the same as the second page. In combination with any of the above embodiments, the memory controller may further include a page history buffer to store a plurality of identifiers of pages that are exempt from idle page closures, and circuitry to add an identifier for the second page to the page history buffer. In combination with any of the above embodiments, the memory controller may further include circuitry to evict an identifier of a third page from the page history buffer based on the addition of the identifier of the second page to the page history buffer. In combination with any of the above embodiments, the identifier of the third page may be randomly selected from the plurality of identifiers of pages that are exempt from idle page closures. In combination with any of the above embodiments, the identifier of the third page may be selected from the plurality of identifiers of pages that are exempt from idle page closures based on a first-in-first-out policy.

Embodiments of the present disclosure may include a method. The method may include receiving a request to open a first page, determining, based on the identity of the first page, that a previously closed page was subject to a premature idle page closure, and adding an identifier of the previously closed page to a page history buffer storing identifiers of exempt pages based on the determination. In combination with any of the above embodiments, the method may further include evicting an identifier of a second page from the page history buffer based on adding the identifier of the previously closed page. In combination with any of the above embodiments, the second page may be selected randomly from the identifiers of exempt pages in the page history buffer. In combination with any of the above embodiments, determining, based on the first page, that a previously closed page subject to a premature idle page closure may include determining that the previously closed page was subject to an idle page closure, determining that no page is currently open, and determining that the first page is the same as the previously closed page. In combination with any of the above embodiments, the method may further include receiving a signal to perform an idle page closure on an open page, determining that the open page is exempt from idle page closures, and keeping the open page open based on the determination that open page is exempt from idle page closures. In combination with any of the above embodiments, determining that the open page is exempt from idle page closures may include determining that an identifier of the open page is in the page history buffer.

Embodiments of the present disclosure may include an apparatus. The apparatus may include a processor means, including a memory controller means, a memory means, including a row buffer means, wherein the memory controller means includes means to determine that a page stored in the row buffer means has been idle for a time exceeding a predetermined threshold, determine whether the page is exempt from idle page closures, and based on a determination that the page is exempt, refrain from closing the page. In combination with any of the above embodiments, the means to determine whether the page is exempt from idle page closures may include a page history buffer means to store a plurality of identifiers of pages that are exempt from idle page closures, means to determine whether the plurality of identifiers of pages that are exempt from idle page closures includes an identifier of the page stored in the row buffer. In combination with any of the above embodiments, the memory controller means further includes means to receive a request to open a second page, and a page management trigger means including means to determine that the row buffer means is empty, determine that a most recently closed page was closed through an idle page closure, and determine that the most recently closed page is the same as the second page. In combination with any of the above embodiments, the memory controller means may further include a page history buffer means to store a plurality of identifiers of pages that are exempt from idle page closures, and means to add an identifier for the second page to the page history buffer means. In combination with any of the above embodiments, the means to add the identifier may include means to determine whether the second page has been subject to a number of premature idle page closures exceeding a predetermined threshold. In combination with any of the above embodiments, the predetermined threshold may be 0. In combination with any of the above embodiments, the predetermined threshold may be 1. In combination with any of the above embodiments, the memory controller means may further include means to evict an identifier of a third page from the page history buffer means based on the addition of the identifier of the second page to the page history buffer means. In combination with any of the above embodiments, the identifier of the third page may be randomly selected from the plurality of identifiers of pages that are exempt from idle page closures. In combination with any of the above embodiments, the identifier of the third page may be selected from the plurality of identifiers of pages that are exempt from idle page closures based on a first-in-first-out policy.

What is claimed is:

1. A method, comprising:
   determining, by first circuitry of a memory controller in a processor, that a first page stored in a row buffer in a memory coupled to the memory controller has been idle for a time exceeding a predetermined threshold;
   determining whether the first page is exempt from idle page closures;
   based on a determination that the first page is exempt, refraining from closing the first page;
   receiving a request to open a second first page;
   determining, by a page management trigger circuit including circuitry, that the row buffer is empty;
   determining, that a previously closed page was closed through an idle page closure;
   determining that the previously closed page is the same as the second page; and
   adding an identifier of the previously closed page to a page history buffer storing identifiers of pages that are exempt from idle page closures.

2. The method of claim 1, further comprising evicting an identifier of a third page from the page history buffer based on adding the identifier of the previously closed page.

3. The method of claim 2, wherein the third page is selected randomly from the identifiers of exempt pages in the page history buffer.

4. The method of claim 1, further comprising:
   receiving a signal to perform an idle page closure on an open page;
   determining that the open page is exempt from idle page closures; and
   keeping the open page open based on the determination that the open page is exempt from idle page closures.

5. The method of claim 4 wherein determining that the open page is exempt from idle page closures comprises determining that an identifier of the open page is in the page history buffer.

6. A system, comprising:
   a processor;
   a memory controller coupled to the processor;
   a memory, coupled to the memory controller and including a row buffer, wherein the memory controller includes:
      a page history buffer to store a plurality of identifiers of pages that are exempt from idle page closures;
      first circuitry to receive a request to open a first page;
      second circuitry to:
         determine that the row buffer is empty;
         determine that a most recently closed page was closed through an idle page closure; and
         determine that the most recently closed page is the same as the first page;
      third circuitry to add an identifier for the first page to the page history buffer; and
      fourth circuitry to, subsequent to opening the first page in the row buffer:
         determine that the first page stored in the row buffer has been idle for a time exceeding a predetermined threshold;
         determine whether the first page is exempt from idle page closures; and
         based on a determination that the first page is exempt, refrain from closing the first page.

7. The system of claim 6, wherein the fourth circuitry to determine whether the first page is exempt from idle page closures comprises:
   fifth circuitry to determine whether the plurality of identifiers of pages that are exempt from idle page closures includes an identifier of the first page stored in the row buffer.

8. The system of claim 6, wherein the memory controller further is to evict an identifier of a third page from the page history buffer based on the addition of the identifier of the first page to the page history buffer.

9. The system of claim 8, wherein the identifier of the third page is randomly selected from the plurality of identifiers of pages that are exempt from idle page closures.

10. The system of claim 8, wherein the identifier of the third page is selected from the plurality of identifiers of pages that are exempt from idle page closures based on a first-in-first-out policy.

11. The system of claim 6, wherein the third circuitry further is to:
   increment a counter associated with the first page; and determine whether to add the identifier for the first page to the page history buffer based on a comparison of the counter to a second predetermined threshold associated with a maximum number of premature idle page closures.

12. The system of claim 6, wherein the identifier for the first page is to be added to the page history buffer based on a single premature idle page closure of the first page.

13. A processor, comprising a memory controller including:
    a page history buffer to store a plurality of identifiers of pages that are exempt from idle page closures; and
    circuitry to:
        receive a request to open a first page;
        determine that a row buffer of memory is empty;
        determine that a most recently closed page was closed through an idle page closure;
        determine that the most recently closed page is the same as the first page;
        add an identifier for the first page to the page history buffer;
        subsequent to opening the first page in the row buffer, determine that the first page stored in the row buffer has been idle for a time exceeding a predetermined threshold;
        determine that the first page is exempt from idle page closures based on the identifier for the first page added to the page history buffer; and
        based on a determination that the first page is exempt, refrain from closing the first page.

14. The processor of claim 13, wherein the circuitry to determine whether the page is exempt from idle page closures further is to:
    determine whether the plurality of identifiers of pages that are exempt from idle page closures includes an identifier of the page stored in the row buffer.

15. The processor of claim 13, wherein the memory controller further is to evict an identifier of a third page from the page history buffer based on the addition of the identifier of the first page to the page history buffer.

16. The processor of claim 15, wherein the identifier of the third page is randomly selected from the plurality of identifiers of pages that are exempt from idle page closures.

17. The processor of claim 15, wherein the identifier of the third page is selected from the plurality of identifiers of pages that are exempt from idle page closures based on a first-in-first-out policy.

18. The processor of claim 15, wherein the identifier of the third page is selected based on a determination that the third page is the least recently used page of the pages that are exempt from idle page closures.

19. The processor of claim 13, wherein the circuitry to determine that the most recently closed page was closed through an idle page closure includes determining that a signal stored in a flag store indicates that the most recently closed page was due to an idle page closure.

20. The processor of claim 13, wherein the circuitry further is to:
    receive a signal to perform an idle page closure on an open page;
    determine that the open page is not exempt from idle page closures by determining that an identifier of the open page is not stored in the page history buffer; and
    close the open page based on the determination that the open page is not exempt from idle page closures.

* * * * *